US011523410B2

(12) United States Patent
Frenne et al.

(10) Patent No.: US 11,523,410 B2
(45) Date of Patent: Dec. 6, 2022

(54) APPARATUSES, METHODS, COMPUTER PROGRAMS AND COMPUTER PROGRAM PRODUCTS FOR BEAM INDICATION

(71) Applicant: Telefonaktiebolaget LM Ericsson (publ), Stockholm (SE)

(72) Inventors: Mattias Frenne, Uppsala (SE); Sebastian Faxér, Järfälla (SE); Stephen Grant, Pleasanton, CA (US); Claes Tidestav, Bålsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/637,994

(22) PCT Filed: Aug. 7, 2018

(86) PCT No.: PCT/SE2018/050796
§ 371 (c)(1),
(2) Date: Feb. 10, 2020

(87) PCT Pub. No.: WO2019/032020
PCT Pub. Date: Feb. 14, 2019

(65) Prior Publication Data
US 2020/0252951 A1 Aug. 6, 2020

Related U.S. Application Data

(60) Provisional application No. 62/544,534, filed on Aug. 11, 2017.

(51) Int. Cl.
*H04L 5/00* (2006.01)
*H04W 72/12* (2009.01)
(Continued)

(52) U.S. Cl.
CPC ...... *H04W 72/1257* (2013.01); *H04B 7/0617* (2013.01); *H04L 5/0023* (2013.01);
(Continued)

(58) Field of Classification Search
USPC .......................................................... 370/329
See application file for complete search history.

(56) References Cited

U.S. PATENT DOCUMENTS 9,755,800 B2 * 9/2017 Kim ........................ H04L 1/00
2019/0159209 A1 * 5/2019 Xiao ..................... H04L 5/0051
(Continued)

OTHER PUBLICATIONS

International Search Report and Written Opinion issued in International Application No. PCT/SE2018/050796 dated Oct. 18, 2018 (17 pages).
(Continued)

*Primary Examiner* — Jeffrey M Rutkowski
*Assistant Examiner* — Luna Weissberger
(74) *Attorney, Agent, or Firm* — Rothwell, Figg, Ernst & Manbeck, P.C.

(57) ABSTRACT

In some embodiments, a network (e.g., a TRP) provides to a UE information indicating that a transmitted "first" RS resource (or "RS" for short) is quasi-co-located (QCL) with a scheduled transmission for the UE (e.g., a "second" RS). The UE may then receive the scheduled transmission under an assumption that the scheduled transmission (e.g., a second RS, such as a demodulation RS (DMRS)) is QCL with the first RS. The UE may receive such QCL information before, after or while receiving the first RS.

8 Claims, 19 Drawing Sheets

(51) Int. Cl.
  *H04B 7/06* (2006.01)
  *H04L 5/10* (2006.01)
  *H04W 24/10* (2009.01)

(52) U.S. Cl.
  CPC .......... *H04L 5/0051* (2013.01); *H04L 5/0094* (2013.01); *H04L 5/10* (2013.01); *H04W 24/10* (2013.01)

(56) References Cited

U.S. PATENT DOCUMENTS

2019/0379431 A1* 12/2019 Park .................. H04L 27/2613
2020/0304256 A1*  9/2020 Park .................. H04W 72/042

OTHER PUBLICATIONS

International Preliminary Report on Patentability issued in International Application No. PCT/SE2018/050796, dated Oct. 8, 2019, (28 pages).

Nokia, "Summary of QCL", 3GPP TSG RAN WG1 NR Ad-Hoc#2, R1-1711672, Qingdao, P.R. China, Jun. 27-30, 2017 (11 pages).
Nokia, Alcatel-Lucent Shanghai Bell, "On QCL Framework and Configurations in NR", 3GPP TSG RAN WG1 NR Ad-Hoc#2, R1-1711312, Qingdao, P.R. China, Jun. 27-30, 2017 (6 pages).
Nokia, Alcatel-Lucent Shanghai Bell, "BPL definition and Spatial QCL time indication", 3GPP TSG RAN WG1 NR Ad-Hoc#2, R1-1711292, Qingdao, P.R. China, Jun. 27-30, 2017 (6 pages).
NTT Docomo, "Views on beam management details", 3GPP TSG RAN WG1 Ad-Hoc#2, R1-1711075, Qingdao, P.R. China, Jun. 27-30, 2017 (8 pages).
Ericsson, Intel, ZTE, . . . , "WF on Beam-Related Indication", 3GPP TSG RAN WG1 Meeting #88bis, R1-1706540, Spokane, USA Apr. 3-7, 2017 (15 pages).
ZTE, "Discussion on DL beam management", 3GPP TSG RAN WG1 NR Ad-Hoc#2, R1-1710183, Qingdao, P.R. China, Jun. 27-30, 2017 (8 pages).
Ericsson, "QCL for Mult-Shot or Aperiodic CSI-RS", 3GPP TSG-RAN WG1#86bis, R1-1612674, Reno, USA Nov. 2016 (4 pages).

* cited by examiner

| QRI State | RS Type | Reference signal index-to-QRI Association | Reference signal index |
|---|---|---|---|
| 0 | SSB | Implicit | Time Index=4 |
| 1 | SSB | Explicit | Time Index=8 |
| 2 | SSB | Explicit | Time Index=45 |
| 3 | p-CSI-RS | Explicit | CRI=21 |
| 4 | p-CSI-RS | Explicit | CRI=8 |
| 5 | p-CSI-RS | Explicit | CRI=56 |
| 6 | p-CSI-RS | Implicit | CRI=3 |
| 7 | p-CSI-RS | Implicit | CRI=7 |

Signaled To UE explicitly

Example of different QRI states for both periodically transmitted reference signals (SSB, p-CSI-RS) and aperiodically transmitted reference signals (a-CSI-RS). The reference signal index-to-QRI association is either explicitly signalled to the UE or implicitly determined

FIG. 17

Example of explicit signalling of CRI-to-QRI association for the case of periodically transmitted CSI-RS (p-CSI-RS).

Example of implicit signalling of CRI-to-QRI association for the case of aperiodically transmitted CSI-RS (a-CSI-RS)

US 11,523,410 B2

APPARATUSES, METHODS, COMPUTER PROGRAMS AND COMPUTER PROGRAM PRODUCTS FOR BEAM INDICATION

CROSS REFERENCE TO RELATED APPLICATION(S)

This application is a 35 U.S.C. § 371 National Stage of International Patent Application No. PCT/SE2018/050796, filed Aug. 7, 2018, designating the United States and claiming priority to U.S. provisional application No. 62/544,534, filed on Aug. 11, 2017. The above identified applications are incorporated by reference.

TECHNICAL FIELD

Disclosed are embodiments for beam indication in a system using more than one (i.e., a plurality of) transmit beams.

BACKGROUND

The Third Generation Partnership Project (3GPP) has begun work on the development and design of the next generation mobile communications system (the 5G mobile communication system or simply "5G"). 5G will encompass an evolution of today's 4G networks and the addition of a new, globally standardized radio access technology known as "New Radio" (NR).

The large variety of requirements for NR implies that frequency bands at many different carrier frequencies will be needed. For example, low bands will be needed to achieve sufficient coverage and higher bands (e.g. mmW, such as near and above 30 GHz) will be needed to reach the required capacity. At high frequencies the propagation properties are more challenging and high order beamforming at the base station will be required to reach sufficient link budget. For example, narrow beam transmission and reception schemes may be needed at higher frequencies to compensate for the high propagation loss. For a given communication link, a beam can be applied at the transmission point (TRP) (i.e., a TRP transmit (TX) beam) and a beam can be applied at a user equipment (UE) (i.e., a UE receive (RX) beam)).

NR will have a beam centric design, which means that the traditional cell concept is relaxed and UEs (i.e., fixed or mobile wireless devices, such as smartphones, tablets, sensors, appliances, etc.) will in many cases be connected to and perform "handover" between narrow beams instead of cells. Hence, 3GPP has agreed to introduce concepts for handling mobility between beams (both within and between TRPs). As used herein, a TRP may include, for example, a base station or a component of a base station. At higher frequencies, where high-gain beamforming will be needed, each beam will only be optimal within a small area (i.e., the beam's coverage area) and the link budget outside the coverage area will deteriorate quickly. Hence, frequent and fast beam switching methods are needed to maintain high performance (so called beam management). For the downlink data channel (PDSCH), it has been agreed to introduce a beam indicator in the scheduling downlink control information (DCI) message that informs the UE of which beam is used so that the UE can adjust its receive beam accordingly. For the physical downlink control channel (PDCCH), it has been agreed to introduce a beam indicator in a separate control message carried by the MAC layer, more specifically a MAC control element (MAC-CE). See also Section 3 below. This is especially important in case of analog RX beamforming because the UE needs to know the direction in which to point its RX beam before the downlink data arrives.

SUMMARY

NR supports beamforming of several different reference signal (RS) types: SS Blocks (SSB), periodic CSI-RS (p-CSI-RS) and aperiodic (a-CSI-RS) for different use cases, and each with different pros/cons. SSB is always on as it is used for initial access, it is periodically transmitted, and the number of SSBs should be kept low to avoid overhead, interference and energy consumption. p-CSI-RS is also periodically transmitted when configured, and is typically shared and cannot be adjusted to a certain UEs radio conditions as the a-CSI-RS can. On the other hand, a-CSI-RS is user specific and may require additional signaling overhead. Hence, there is not one solution that is perfect and fits all. A challenge, therefore, is how best to perform beam indication in NR with such a mix of different RSs (e.g., how to perform beam indication such that efficiency is maximized, overhead is reduced, interference is lowered, attainable beamforming gain is maximized when needed, and/or to latency is reduced).

Disclosed herein are techniques for beam indication that address this challenge. In some embodiments, the network (e.g., a TRP) provides to a UE information indicating that a transmitted "first" RS resource (or "RS" for short) is quasi-co-located (QCL) with a scheduled transmission for the UE (e.g., a "second" RS). The UE may then receive the scheduled transmission under an assumption that the scheduled transmission (e.g., a second RS, such as a demodulation RS (DMRS)) is QCL with the first RS. The UE may receive such QCL information before, after or while receiving the first RS.

In some embodiments, the information comprises a QCL Reference Indictor (QRI), representing a QRI state selected from a set of available QRI states. In some embodiments, the QRI informs the UE as to the particular RS resource (SSB, p-CSI-RS, a-CSI-RS) type with which a scheduled transmission (e.g., a scheduled DMRS) is QCL (e.g., spatially QCL), for the purposes of PDSCH/PDCCH reception. If two transmitted RSs are QCL at the receiver, then the receiver can assume that the first and second transmitted RS are transmitted with approximately the same beam pattern, and therefore the receiver can use approximately the same RX beam to receive the second reference signal (e.g., DMRS) it is used to receive the first RS. Thus, in some embodiments, a transmitted RS (such as a p-CSI-RS or SSB), which is indicated by QRI in a DCI message, is spatially QCL with the PDSCH DMRS that is scheduled by the same DCI message. Hence, the receiver can when receiving PDSCH use the same RX beam as when it receives the indicated transmitted RS.

In some embodiments, to be flexible in scheduling different beams and/or transmission points, the QRI can indicate one transmission out of several different RS transmissions (e.g. several different beams) that have occurred in the past. One way to describe this is with a list, e.g. a 2-bit QRI and a list with 4 entries.

In some embodiments, the QRI is signaled to the UE in a downlink control message (DCI or MAC-CE) and may be drawn from a list of QRI entries (a.k.a., states) where the list, in some embodiments, is comprised both of entries with an association to a periodically transmitted RS (e.g., SSB and/or p-CSI-RS) and entries with an association to an aperiodically transmitted RS, e.g., a-CSI-RS. Each entry in the list may further be associated with an index of an RS resource (e.g., an index of an RS resource that the UE used for measurements at some prior point in time), e.g., time index or other resource index in the case of SSB, or CSI-RS resource indicator (CRI) in the case of p/a-CSI-RS. We adopt the terminology RS index (RSI) to refer to the RS resource index generically. Another aspect is that, in some embodiments, the association between QRI state and RSI is signaled to the UE in either (1) an explicit manner (e.g., through RRC or MAC-CE signaling) or (2) an implicit manner.

Method (1) (explicit signaling) may be used in the case where the UE performs measurements typically on a large number of periodic RS resources (SSB or p-CSI-RS) (i.e., large number of TX beams) and provides RSRP feedback (including corresponding RSI) to the eNB on a set of preferred resources (beams). The NR base station (gNB) then selects a subset of the measured/reported RSIs and associates them to the QRI states in the list. The signaling may be transmitted to the UE after it has completed the measurement. In this way, resource indices with a large index space are re-indexed into a number of QRI states with a significantly lower index space. This re-indexing or association is then signaled to the UE on a relatively slow basis based on RRC or MAC-CE signaling. The purpose is to reduce the overhead in later beam indication signaling (QRI signaling), especially in the case of signaling over DCI where the overhead is constrained.

Method (2) (implicit signaling) may be used in a case where the UE performs measurements on a set of aperiodic RS resources (a-CSI-RS). Again, the UE may provide RSRP feedback (including RSI) to the gNB on the preferred resource (beam). However, unlike for method (1), the association between QRI state and RSI is not explicitly signaled to the UE subsequent to the measurement. Rather, the QRI (e.g. 2 bits) is included in the message triggering the measurement on the set of aperiodic RS resource in the first place. In this sense, the association between QRI and RSI is implicitly determined based on the measurement trigger and the preferred resource (RSI) based on the most recent measurement on the set of aperiodically transmitted RS. Method (2) may also be used in the case of an initial access procedure in which case the UE assumes, for example, that QRI=0 which is reserved for the beam pair link determined based on the random access procedure. The association of QRI=0 to RSI is obtained implicitly based on the time index of the preferred SSB selected by the UE (encoded in the PBCH).

Advantages

An advantage is that the gNB can flexibly perform beam indication based on different measurements. For example, in embodiments in which a record, in particular a table or look-up table, of QRIs is maintained at the UE with separate entries corresponding to measurements on different signals (p-CSI-RS, SSB, and a-CSI-RS), the gNB can flexibly perform beam indication based on these different measurements. For instance, the TX beams corresponding to SSB and/or p-CSI-RS may be wider in beamwidth, have lower gain, and thus more robust to UE movement/rotation than those based on more UE specifically refined measurements based on a-CSI-RS.

Another advantage is that the network can dynamically switch (by QRI signaling in the scheduling message) from transmitting data in more robust beams (SSB, p-CSI-RS based QRI states) to UE specific beams (a-CSI-RS based QRI states) when measurements on UE specific beams are available and vice versa, return to robust beams when reports for UE specific beams are outdated. This leads to increased system robustness, especially for mmwave operation.

Accordingly, in one aspect there is provided a method performed by a wireless device (a.k.a., UE) for receiving a downlink transmission. The method includes receiving a first reference signal, RS; before or after or while receiving the first RS, further receiving information indicating that the first RS is quasi-co-located, QCL, with a scheduled transmission; and receiving the scheduled transmission under an assumption that the scheduled transmission is QCL with the first RS. In another aspect, a UE configured to perform the foregoing process is provided.

In another aspect there is provided a method performed by an access network for providing beam indications to a wireless device. The method includes: transmitting a reference signal (RS) resource to be used by a UE to perform a measurement; obtaining data for the UE; scheduling the transmission of the data to the UE; and transmitting the data to the UE. The scheduling of the transmission of the data to the UE comprises transmitting a control message (e.g., a DCI or a MAC-CE) to the UE, the control message comprising information informing the UE that the previously transmitted RS resource is QCL with a second RS resource for use in assisting the UE in obtaining the transmitted data (e.g., a demodulation RS (DMRS)). In another aspect, an access network configured to perform the foregoing process is provided.

BRIEF DESCRIPTION OF THE DRAWINGS

The accompanying drawings, which are incorporated herein and form part of the specification, illustrate various embodiments.

FIG. 17 is a table providing an example of different QRI states for both periodically transmitted reference signals (SSB, p-CSI-RS) and aperiodically transmitted reference signals (a-CSI-RS).

DETAILED DESCRIPTION

Figure 1A:
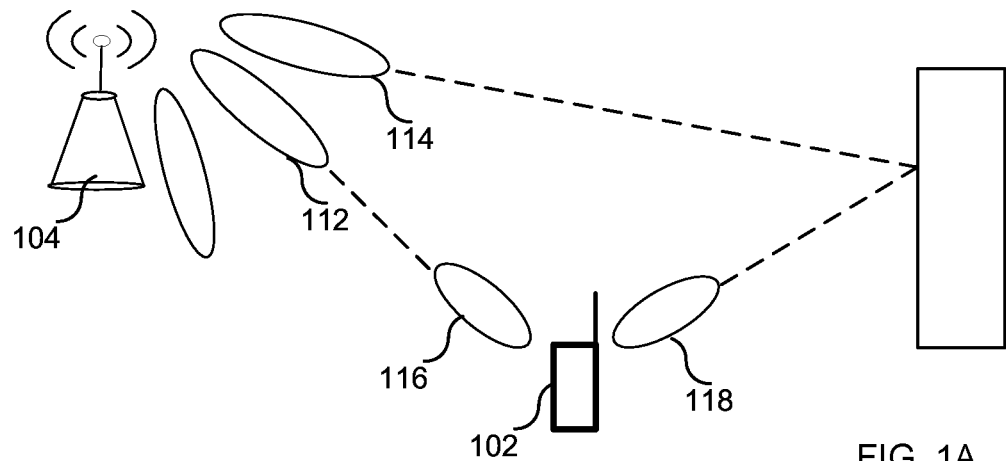
FIGS. 1A, 1B and 1C illustrate the use of active and monitored TX beams for communications between a TRP and a UE.

To perform measurement of channel quality of a certain beam, a beamformed reference signal (RS) is introduced. This RS can be a channel state information RS (CSI-RS) or a synchronization signal block (SSB or SSBlock). Beamforming implies transmitting the same signal from multiple antenna elements of an antenna array with an amplitude and/or phase shift applied to the signal for each antenna element. These amplitude/phase shifts are commonly denoted as the antenna weights and the collection of the antenna weights for each of the antennas is a precoding vector.

Different precoding vectors give rise to a beamforming of the transmitted signal and the weights can be controlled so that the signals are coherently combining in a certain angle direction as seen from the antenna array in which case it is the that a beam is formed in that direction. If the antennas of the array are placed in two dimensions (i.e., in a plane) then the beam can be steered in both azimuth and elevation directions with respect to the plane perpendicular to the antenna array.

Although the term beam is used, there are other precoding vectors that gives a transmission that is matched to the channel and which does not give a beam in a strict sense. For instance, if the channel is known at the TRP, the precoding weight can be controlled so that the signal strength is maximized at the UE, instead of forming a beam to give the maximal array gain in a certain direction. Matched channel precoding is optimal in maximizing the signal power at the receiver, but it requires accurate channel information. In line-of-sight channels however, the use of a beam is near-optimal. Though discussed with respect to beam, the disclosures herein are presented without loss of generality.

In NR it is proposed that CSI-RS is used as reference signal for beam management but also other signals, such as SSBlocks, are being considered. SSBlocks are periodic in nature, e.g., a beam sweep of up to 64 beams (one per SSB) is performed every 20 ms (see also Section 6 below). In contrast, CSI-RSs can be either triggered aperiodically or configured to be periodic. In the most general case, a UE can be configured to measure on any combination of periodic SSB, periodic CSI-RS, and aperiodic CSI-RS for the purposes of beam management. The network (NW), NR base station (gNB) or another node will configure the UE with a CSI-RS configuration by a control message such as a radio resource control (RRC) message, where each configuration will contain one or multiple CSI-RS resources. One or multiple UEs will then perform measurements on these CSI-RS resources and report the result back to the network.

1. Measurements for Beam Management

In one use case, each CSI-RS resource or SSB (with a given SSB resource index) is transmitted in a different TRP TX beam (i.e. with a different multi-antenna precoding weight to form beams in different directions as seen from the TRP antenna array).

The UE is configured to perform channel quality measurements (such as reference signal received power (RSRP)) on the particular reference signal (CSI-RS or SSB) corresponding to the different TRP TX beams and it may further be configured to report back these measurements to the NW. In this way it is possible, by using the measurement report (s), for the NW to find a preferred TRP TX beam(s) for a given UE.

In another use case, each CSI-RS resource is transmitted in the same TRP TX beam In this way the UE can evaluate different UE RX beams for the used TRP TX beam, and find a preferred UE RX beam for the particular TRP TX beam. The repeated transmission of the CSI-RS resource in the same beam, in e.g. different OFDM symbols or using a frequency-domain comb resulting in a time-domain repetition pattern, is useful for example when analog receive beamforming is applied at the UE since the UE can then switch RX beam between or within the OFDM symbols and evaluate the link quality.

The CSI-RS transmission can be either aperiodic (for example event triggered) or transmitted in a semi-persistent/periodic manner. In case the CSI-RS transmissions are transmitted in a semi-persistent/periodic manner, also the measurement reports can be configured in a semi-persistent/periodic manner.

Using the measurement procedures described above, the UE can find a preferred TRP TX beam and for that beam a preferred UE RX beam. The TX-RX beam pair is sometimes referred to as a beam pair link (BPL).

2. Robust Beam Management

One problem, however, with connecting UEs to narrow beams is that the BPL could easily be deteriorated, for example, if an object gets in the way of the link and blocks it. Due to what is often high penetration loss and poor diffraction properties at high frequencies, a blocking object can lead to lost connection between the TRP and UE (so called a beam link failure (BLF) or BPL failure (BPLF)), which might lead to dropped calls and bad user experience.

Figure 1B:
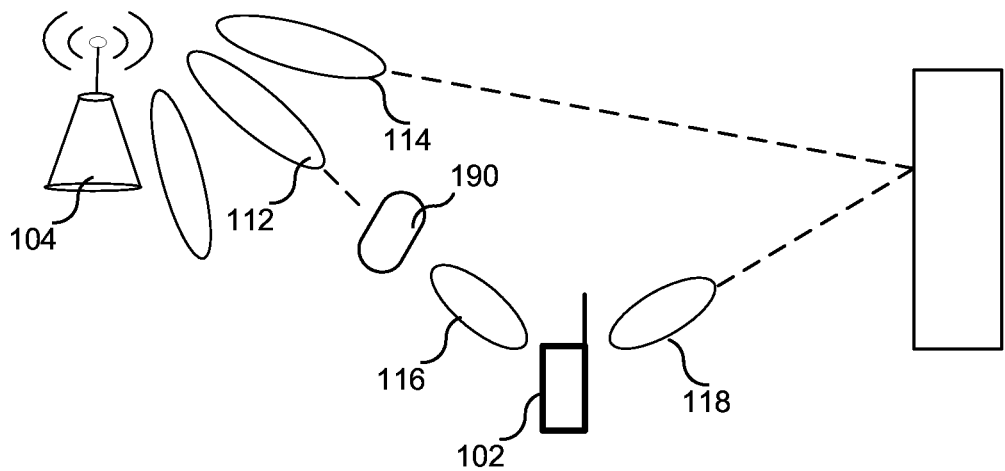
Figure 1C:
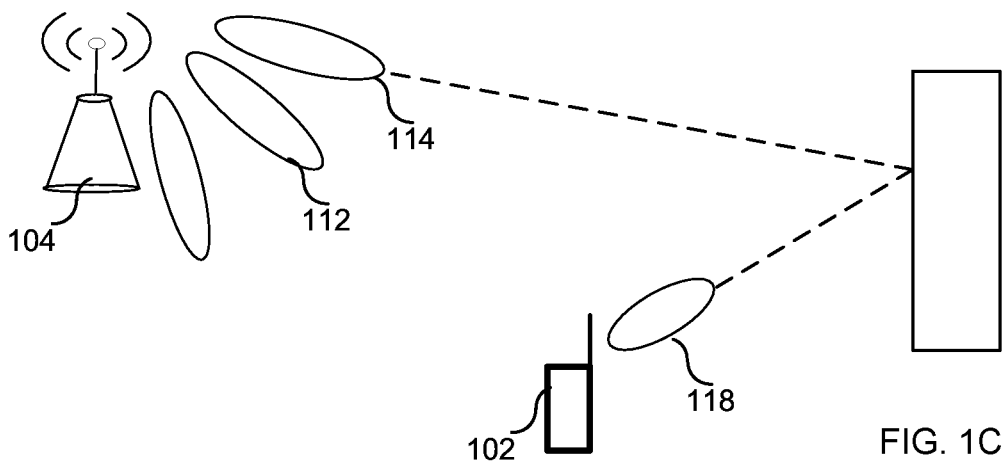

One way to mitigate the problem of beam link failure is to use a second, monitored (a.k.a., "backup") transmit beam that can be used in case the first, active TX beam experiences a BLF (e.g., is blocked). Hence, at least two TX beams may be used to connect with a UE. An example of this is illustrated in FIGS. 1A, 1B and 1C. In FIG. 1A, there is shown a TRP 104 (e.g., a base station) using one active TX beam 112 to transmit to a UE 102 control information and user data and further using one monitored (backup) TX beam 114 for UE 102. In FIG. 1B there is shown an object 190 that is blocking the active TX beam, thereby causing UE 102 to detect a BLF with respect to the active TX beam. To restore the connection between TRP 104 and UE 102, TRP 104 can use the monitored TX beam as the active TX beam for UE 102, as illustrated in FIG. 1C. According to certain aspects, the purpose of the monitored link is thus to (1) discover new links that may better than the active link; and (2) provide a backup link in case the active link is broken.

In the example of FIGS. 1A-C, there is one UE RX beam associated with each TRP TX beam, which is often the case if analog or hybrid receive beamforming is used at UE 102. Specifically, UE RX beam 116 is paired with TRP TX beam 112 and UE RX beam 118 is paired with TRP TX beam 114. In the case UE 102 uses pure analog receive beamforming, UE 102 can only tune its RX beam to one TRP transmit beam at a time, e.g. per OFDM symbol. Likewise, if TRP 104 uses analog transmit beamforming, only one beam can be transmitted at a time, e.g. per OFDM symbol. Hence, there is a need to align the transmit beam with the correct receive beam at a given time. For each of the TRP TX beams, at a given point in time, there is an preferred or "optimal" UE RX beam (i.e., parameters) associated with it, among the set of possible UE RX beams.

3. Signaling for Beam Management

For NR, it has been agreed that for reception of unicast DL data channel (PDSCH), NR supports indication of spatial quasi-co-location (QCL) assumption between DL RS antenna port(s) and DMRS antenna port(s) of DL data channel: Information indicating the RS antenna port(s) is indicated via DCI (downlink grants), i.e. UE specific indication. The information indicates the RS antenna port(s) which the UE is allowed to assume to be spatially QCL-ed with DMRS antenna port(s), and spatial QCL can be interpreted as the DL RS and DMRS can be received in a spatially equivalent way at the UE, in other words using the same spatial filter, spatial precoder or beam. As a possible alternative characterization of spatial QCL, it is noted that the 3GPP RAN #86 bis meeting agreed for further study the following quantities: receive angle of arrival, transmit angle of departure, spatial correlation of receiver antennas, receive beamforming, transmit beamforming.

It has been further agreed that NR supports a similar indication of spatial QCL assumption for the reception of a user-specific DL control channel (PDCCH), except that the indication is to be contained in a MAC Control Element (MAC-CE) (L2 signaling) in contrast to a DCI message (L1 signaling).

In U.S. provisional application Nos. 62/417,785 and 62/520,078, a beam tracking process index in the CSI-RS configuration was introduced such that the UE will know which CSI-RS configuration corresponds to which beam tracking process (and link). Also, an additional flag can be included in the CSI-RS configuration that states if the CSI-RS configuration is not related to any beam tracking processes. Hence, each CSI-RS has an explicit indicator bit field that indicates the beam tracking process to which the resource belongs.

In U.S. provisional application No. 62/520,062, a framework defined for RS measurement configuration and reporting is re-used for beam management in the sense that indices or IDs of RRC configured entities such as "Resource setting" or "CSI-RS resource sets" or "CSI report setting", take the role as a beam indicator. Hence, multiple such entities are configured to the UE by higher layers and the UE can keep track of the preferred receiver configuration (e.g. analog RX beam) for each of the entities. The preferred receiver configuration is updated every time the UE performs a measurement for each entity. For example, when the PDSCH is scheduled, the DCI contains a field that points to the entity and the UE can thus apply the receive or transmit filtering for PDSCH, according to the indicated entity. The PDCCH can also be associated with the entities, for example by higher layer configuration.

4. Measurements for Link Adaptation in CSI Framework

Figure 2:
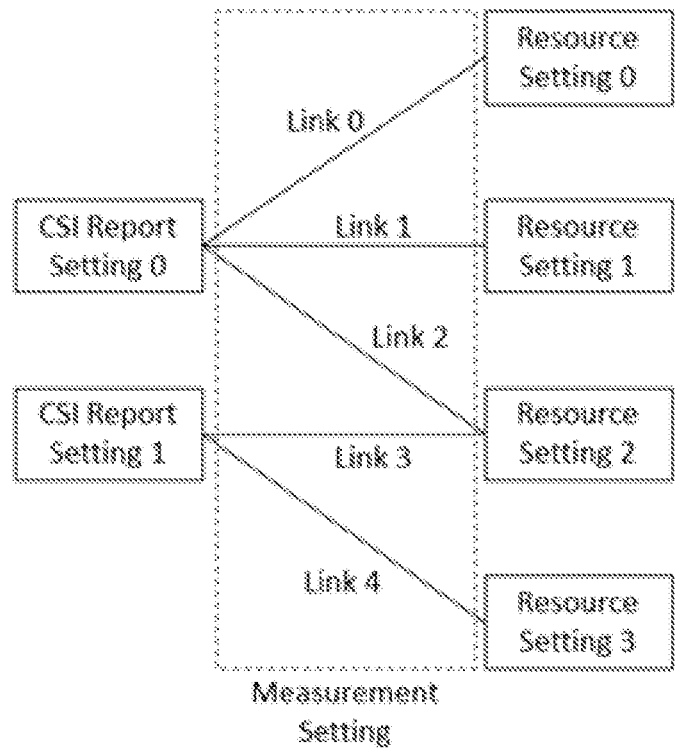
FIG. 2 shows an example of a CSI framework.

The CSI and beam management framework agreed for NR allows for a wide variety of use cases, as well as dynamic reuse of CSI resources. As per the agreed CSI framework, a UE can be configured by higher layers with N≥1 CSI Report Settings, M≥1 Resource settings, and 1 CSI Measurement Settings. The Measurement Setting includes L≥1 links where each link links one Report Setting with one Resource Setting. FIG. 2 shows an example of the agreed CSI/Beam management framework in NR, where N=2, M=4, and L=5.

Within each CSI Report Setting, a UE is configured (by higher layers) with parameters such as the reported CSI parameter(s), codebook configuration parameters, time-domain behavior (i.e., periodic, semi-persistent, or aperiodic) of CSI reporting, codebook subset restriction and measurement restriction.

Figure 3:
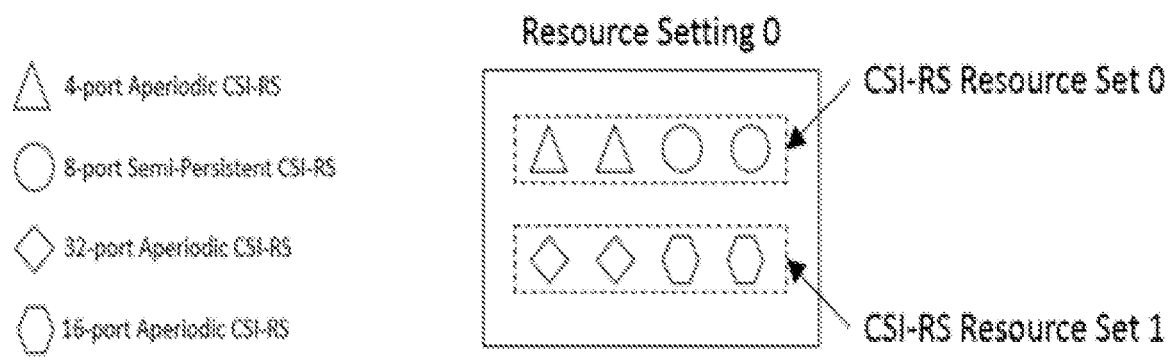
FIG. 3 illustrates example Resource Setting.

Within each Resource Setting, a UE is configured (by higher layers) with a configuration of S≥1 CSI-RS Resource Sets. Within each CSI-RS Resource Set s, the UE is further configured by higher layers with K_s≥1 CSI-RS resources where the CSI-RS resources can have different mappings to REs, different number of ports, and different time-domain behavior (i.e., periodic, semi-persistent, or aperiodic). An example Resource Setting with S=2 CSI-RS Resource Sets is shown in FIG. 3. In this example, the two CSI-RS Resource Sets consist of 4 CSI-RS resources each (that is, K_1=4 and K_2=4). As seen in the example of FIG. 3, the CSI-RS resources within each CSI-RS resource set have mixed number of ports and time-domain behavior. The UE is then dynamically indicated with the following if applicable: a) one or more CSI Report Settings selected from within the CSI Measurement Setting, b) one or more CSI-RS Resource Sets selected from at least one Resource Setting, c) one or more CSI-RS resources selected from at least one CSI-RS Resource Set. The different ways of dynamic indication are discussed below in section 5.

5. Mechanism for Control Signaling

LTE control signaling can be carried in a variety of ways, including carrying control information on PDCCH or PUCCH, embedded in the PUSCH, in MAC control elements ('MAC CEs'), or in RRC signaling. Each of these mechanisms is customized to carry a particular kind of control information.

Control information carried on PDCCH, PUCCH, or embedded in PUSCH is physical layer related control information, such as downlink control information (DCI), uplink control information (UCI), as described in 3GPP TS 36.211, 36.212, and 36.213 for LTE and 38.211, 38.212, 38.213 and 38.214 for NR. DCI is generally used to instruct the UE to perform some physical layer function, providing the needed information to perform the function. UCI generally provides the network with needed information, such as HARQ-ACK, scheduling request (SR), channel state information (CSI), including CQI, PMI, RI, and/or CRI. UCI and DCI can be transmitted on a subframe-by-subframe basis, and so are designed to support rapidly varying parameters, including those that can vary with a fast fading radio channel. Because UCI and DCI can be transmitted in every subframe, UCI or DCI corresponding to a given cell tend to be on the order of tens of bits, in order to limit the amount of control overhead.

Control information carried in MAC CEs is carried in MAC headers on the uplink and downlink shared transport channels (UL-SCH and DL-SCH), as described in 3GPP TS 36.321. Since a MAC header does not have a fixed size, control information in MAC CEs can be sent when it is needed, and does not necessarily represent a fixed overhead. Furthermore, MAC CEs can carry larger control payloads efficiently, since they are carried in UL-SCH or DL-SCH transport channels, which benefit from link adaptation, HARQ, and can be LDPC-coded. MAC CEs are used to perform repetitive tasks that use a fixed set of parameters, such as maintaining timing advance or buffer status reporting, but these tasks generally do not require transmission of a MAC CE on a subframe-by-subframe basis. Consequently, channel state information related to a fast fading radio channel, such as PMI, CQI, RI, and CRI are not carried in MAC CEs in LTE up to Rel-14.

6. Measurements for Initial Access and Beam Management in NR

For NR, it has been agreed that a synchronization signal block (SSB) is to be used for synchronization purposes during initial access. The SSB is comprised of a primary synchronization signal (PSS), a secondary synchronization signal (SSS), and a physical broadcast signal (PBCH) carrying essential system information. The SSB is transmitted periodically with a period of 20 ms, and multiple SSBs may be transmitted within each period, each with a different time index. Within a period, each SSB may be beamformed in a different direction such that the SSB is transmitted in a "beam sweeping" manner over the coverage area of a sector. When a UE performs initial access to the system, it continually "listens" for an SSB, and when it detects the strongest one, it performs a random access procedure using PRACH resources that are associated with the particular time index contained in the detected PBCH. In this way, when the gNB detects the UEs PRACH, it implicitly knows which SSB, and thus which TX beam the UE detected. This gives the gNB some information about an initial coarse beam direction to use for UE-specific beam forming of later data/control channel transmissions.

Since the SSBs are transmitted in a beam sweeping manner, and can be used to detect a suitable TX beam for a user, it is being discussed whether or not SSB should be used more broadly for beam management purposes. One aspect being discussed is for the gNB to configure the UE to report L1-RSRP measurements based on one or more SSB on a regular basis. These may be used to track the direction of a UE as it moves/rotates. Furthermore, these measurements may be used in tandem with measurements on CSI-RS to further refine the beam direction on a UE-specific basis.

7. Embodiments

As discussed above in the Summary section, this disclosure describes beam indication embodiments. In some embodiments, the network (e.g., TRP 104) provides to UE 102 information indicating that a transmitted "first" reference signal (RS) is quasi-co-located (QCL) with a scheduled transmission for the UE (e.g., a "second" RS). The UE may then receive the scheduled transmission under an assumption that the scheduled transmission (e.g., second RS) is QCL with the first RS. The UE may receive such QCL information before, after or while receiving the first RS.

As further noted above, in some embodiments, the information provided to the UE comprises a QRI, representing a QRI state selected from a set of available QRI states. In some embodiments, the QRI informs the UE as to the particular reference signal resource type (SSB, p-CSI-RS, a-CSI-RS) with which a scheduled transmission is QCL (e.g., spatial QCL), for the purposes of PDSCH/PDCCH reception. If two transmitted RSs are QCL, or spatially QCL in particular, at the UE, then the UE can assume that the first and second RSs are transmitted with approximately the same beam pattern, and therefore the UE can use approximately the same RX beam to receive the second RS (e.g., DMRS) that the UE used to receive the first RS. Thus, in some embodiments, a transmitted RS, which is indicated by QRI in a DCI message, is spatially QCL with the PDSCH DMRS that is scheduled by the same DCI message.

In some embodiments, for beam indication purposes, the TRP 104 (e.g., gNB) uses RRC signaling to configure UE 102 with QRI information that associates each one of a plurality of different QRI states to one or more RS types, such as, for example: SSB (periodic), p-CSI-RS, and a-CSI-RS. Such QRI information is represented by the information in Table 1 below, which table associates each one of a plurality of different QRI states to a one or more RS types. In the example, shown QRI states 0 and 1 may be associated to two RS types: SSB and a-CSI-RS.

TABLE 1

| QRI state | RS type | RSI to QR association type |
|---|---|---|
| 0 | SSB | Implicit |
| 1 | SSB | Explicit |
| 2 | SSB | Explicit |
| 3 | p-CSI-RS | Explicit |
| 4 | p-CSI-RS | Explicit |
| 5 (or 0) | a-CSI-RS | Implicit |
| 6 (or 1) | a-CSI-RS | Implicit |

For exemplary purposes, seven different QRI states are shown (i.e., sates 0 to 6), corresponding to establishment of up to seven different beam pair links based on 3 different RS types: SSB, p-CSI-RS, and a-CSI-RS.

Hence, the network can transmit beams in 7 different ways (different beamforming weights (e.g. achieving different beam widths and/or different beam pointing directions) or even from different transmission points) using 7 different RSs and the UE stores the receiver configuration (i.e. analog RX beam) for each of these RS types.

With 7 different QRIs, the beam indication can be signaled with 3 bits. Maintenance of a variety of different beam pair links (BPLs) can be used to have different beam widths on different BPLs, e.g., wider beams for PDCCH (for robustness) and narrower beams for PDSCH (high gain beamforming for high data rates). The wider beamwidths could be associated with the BPLs based on measurements of periodic RSs (SSB, p-CSI-RS), and the narrower (refined) beamwidths could be associated with BPLs based on measurements of aperiodically transmitted CSI-RS. Furthermore, the more robust BPLs can be indicated dynamically for fallback purposes if the narrower beamwidths associated with BPLs based on aperiodic measurements become outdated.

As further shown in Table 1, in some embodiments, the QRI information provided to the UE (e.g., transmitted to the UE using an RRC message) may further include, for each QRI state, information indicating how an association between the QRI state and a reference signal index (RSI) is made known to the UE. In the embodiment shown, the association between QRI state and RSI is made known to the UE either implicitly or explicitly. In both cases, the RSIs are determined based on prior measurements of a set of reference signals and the RSI typically corresponds to a preferred resource index (e.g., the resource index with the largest RSRP). Implicit and explicit RSI determination will be described further below. Based on this determination, as illustrated by Table 2 below, the UE can augment Table 1 such that the augmented table (i.e., Table 2) not only associates each QRI state to an RS type, but also associates each QRI state to an RSI.

TABLE 2

| QRI state | RS type | RSI to QR association type | RSI |
| --- | --- | --- | --- |
| 0 | SSB | Implicit | Time Index = 4 |
| 1 | SSB | Explicit | Time Index = 8 |
| 2 | SSB | Explicit | Time Index = 45 |
| 3 | p-CSI-RS | Explicit | CRI = 21 |
| 4 | p-CSI-RS | Explicit | CRI = 56 |
| 5 (or 0) | a-CSI-RS | Implicit | CRI = 3 |
| 6 (or 1) | a-CSI-RS | Implicit | CRI = 7 |

In the above example, the first row (QRI=0) is reserved for a beam pair link established during the RACH procedure performed during initial access. This is based on the UE detection of a preferred periodically transmitted SSB and the use of the index of this SSB during the RACH procedure. The index is known by both the UE 02 (which made the SSB detection) and the TRP 104 (which received a PRACH preamble associated with this SSB). It is therefore marked "implicit," since the association with the reference signal index (RSI) is determined by the UE during the RACH procedure. The RSI in this case is the time index (e.g., slot index, frame index) of a particular SSB, where a different time index is used for each SSB in a burst of multiple SSBs, typically transmitted in a beam sweeping manner. During the RACH procedure, the UE continually "listens" for an SSB, and when it detects the strongest one, it performs a random access procedure (RACH) using PRACH resources that are associated with the particular time index contained in the detected SSB. In this way, when the TRP 104 detects the UEs PRACH, the TRP 104 implicitly knows which SSB, and thus which TX beam the UE detected. This gives the TRP 104 information about an initial coarse beam direction to use for UE-specific beam forming of later data/control channel transmissions.

For the case of QRI=0 where the RSI is determined implicitly based on SSB during the RACH procedure, Table 2 shows an example where the UE detects the SSB with time index=4. To aid PDSCH/PDCCH reception based on beam indication at a later point in time, the UE should remember the RX receiver configurations such as the RX spatial filtering configuration (RX beam) that it used when it measured the SSB with time index=4. In this way if QRI=0 is indicated to the UE in the future (e.g., indicated to the UE in a further DCI), the UE can recall the receiver configuration to aid reception of PDSCH/PDCCH. In this way, indicating QRI=0 tells the UE that the DMRS for either PDSCH or PDCCH is QCL (e.g., spatially QCL) with the SSB with time index=4.

Figure 4:
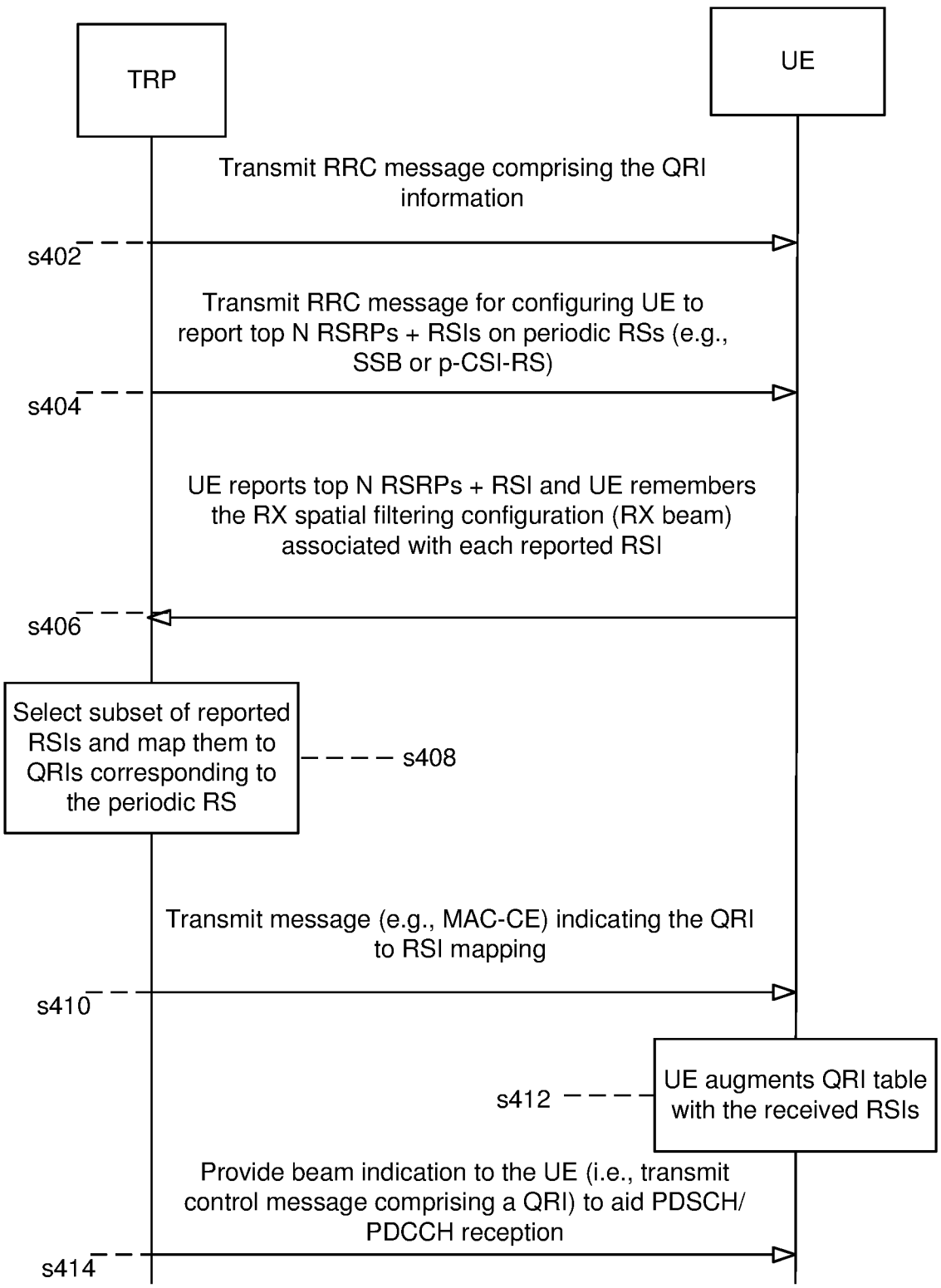
FIG. 4 is a message flow diagram illustrating a process according to some embodiments.

FIG. 4 is a message flow diagram illustrating a process flow in which RSI(s) are determined explicitly. For example, consider the case where the UE is configured to report L1-RSRP on a periodic signal, either SSB or p-CSI-RS. In either case, the set of steps is the same. First the UE is configured with the initial QRI information that associates each one of a plurality of QRI states to a RS type (see e.g., Table 1) (step s402). The TRP then configures the UE to report the top-N RSRPs and the corresponding RSIs (SSB time indices) (step s404). For the case of p-CSI-RS, the RSI would be in the form of a CSI-RS resource indicator (CRI). In general, N>=1. In step s404, the UE reports the top-N RSRPs and the corresponding RSIs.

Once the UE report is received, the gNB selects a subset of the reported RSIs and associates them to QRIs corresponding to the periodic RS configured for measurement (step s408). In Table 1, QRI 1 and 2 are configured for SSB and QRI 3 and 4 are configured for p-CSI-RS. Since the index space (number of periodic RS resources or beams) can quite large, the mapping of reported RSI to QRI effectively achieves a re-indexing of RSIs to a smaller index space. For example, the number of SSBs can be up to 64 and the number of p-CSI-RS resources can be even larger. Thus, for a set of SSBs providing 64 different beams, the RSIs are remapped from a 6-bit index down to a 3-bit QRI. This saves overhead in a later beam indication step. This is important when the beam indicator (e.g., QRI) is carried by DCI which is typically quite constrained in allowed overhead.

The TRP then explicitly signals the QRI to RSI mapping over MAC-CE to the UE (step s410), at which point the UE can take the RSI values and augment the initial QRI information with the RSI values (e.g., populate the RSI column in Table 2) (step s412). This example shows that RSI 8 and 45 are the preferred SSB time indices from a UE measurement perspective (and thus preferred beams). Similar to what was described previously, to aid PDSCH/PDCCH reception based on beam indication at a later point in time, the UE should remember the RX spatial filtering configurations (RX beams) that it used when it measured the SSB with time indices=8 and 45. In this way if either QRI=1 or 2 is indicated in the future (see e.g., step s414), the UE may recall the appropriate spatial filtering configuration to aid reception.

That is, the UE stores QRI to RSI mapping information (e.g., a table) mapping QRI states to RSI values, and the UE associates each such RSI value with an RX configuration. Thus, when the UE receives from the TRP 104 a certain QRI (e.g., QRI=2) in a message for scheduling a transmission to the UE (e.g., a DCI) (see e.g., step s414), the UE can use the received QRI and the stored mapping information to determine the RSI to which the received QRI is associated, and then, based on the determined RSI, the UE can obtain the RX configuration information associated with the determined RSI, and then the UE can use the obtained RX configuration information to receive the scheduled transmission. Hence, the QRI functions as a beam indicator.

In some embodiment, the UE creates the QRI-RSI mapping table (see e.g., Table 2) before any measurements are performed. In another embodiment, the measurements are performed first, and the QRI-RSI mapping table is created and populated at the same time.

Implicit determination of RSI for QRI=0 was described above. Implicit determination of RSI is also relevant when measurements based on aperiodic RS (a-CSI-RS) are used, e.g., for QRI=5 and 6 in Table 2. In this case, the process flow is illustrated in FIG. 5.

Figure 5:
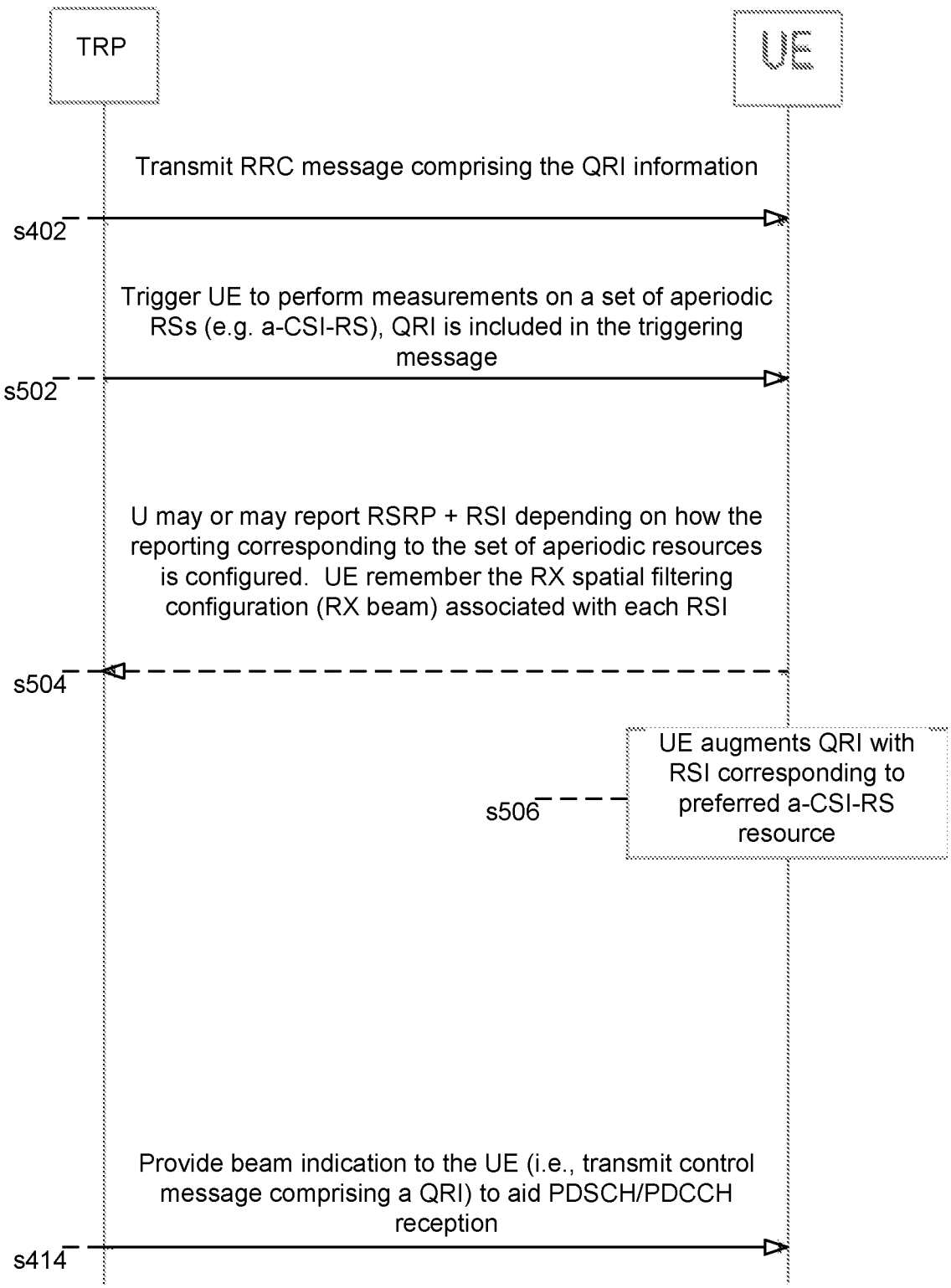
FIG. 5 is message flow diagram illustrating a process according to some embodiments.

As shown in FIG. 5, after performing steps s402, the TRP triggers the UE (e.g., through DCI) to perform measurements on a set of aperiodic RSs (a-CSI-RS) (step s502). As part of the triggering message, the desired QRI is included in the triggering message to inform the UE of what beam pair link is being updated, e.g., QRI=5. Depending on how the UE has been configured for reporting, RSRP+RSI may or may not be reported (step s504). Typically if the UE is selecting amongst a number of TRP TX beams, then RSRP (or CSI)+RSI reporting would be configured. However, if the UE is triggered to perform measurements on a number of a-CSI-RS resources for the purposes of adjusting its own RX beam, then there is no need to report RSI.

Regardless, the UE remembers the RX spatial filtering configuration (RX beam) associated with the preferred a-CSI-RS resource (preferred RSI). The UE also augments the QRI table with the preferred RSI (step s506). In this way, the RSI to QRI association is determined by the UE implicitly, in that the RSI corresponds to the most recent measurement on a-CSI-RS triggered according to a given QRI. At a later point in time, the TRP performs beam indication (step s414), i.e., it signals desired QRI from the list of QRIs, over DCI or MAC-CE. From the QRI, the UE may determine to what RS resource it should assume QCL with the PDSCH/PDCCH DMRS to aid in demodulation.

Note that the QRI table contains a mix of RS types (e.g. SSB, p-CSI-RS or a-CSI-RS). The QRI table can be updated at any point in time, both regarding the RS types and the RSI values.

In some embodiments, the partition of the QRI table between RS types is configured over RRC. For example, the configuration may include the size of the QRI table, the number of QRI states that are allocated for SSB and the number of QRI states that are allocated for p-CSI-RS. Remaining states may be assumed to be allocated to a-CSI-RS.

In some such embodiments, where the number of QRI states allocated to a-CSI-RS is known, those QRI states may be locally indexed with a Dynamic QRI (DQRI). For example, QRI=5 and QRI=6 may be mapped to DQRI=0 and DQRI=1, respectively. Since it is only the QRI states that are associated with a-CSI-RS that possibly can be included in a trigger for an aperiodic measurement, the DQRI quantity may be signaled in the trigger message instead of the QRI, which will reduce the signaling overhead (1 bit vs 3 bits in the given example). That is, the QRIs stored in the first column of Table 2 need not be unique.

As the above demonstrates, TRP 104 may transmit to UE 102 a downlink control channel scheduling message (e.g. DCI) (or a MAC control message (e.g., MAC-CE)) comprising a selected QRI selected from a set of QRIs, where the UE stores information mapping the selected QRI to an RSI. The UE uses the indicated QRI to determine the RSI to which the indicated QRI is associated and uses the determined RSI as a reference for adjusting receiver configuration such as timing adjustment and/or analog RX beam.

In one embodiment, the information mapping the selected QRI to an RSI associates each one of a plurality of QRIs to an RSI and each such RSI is associated with an RS. In some embodiments, at least one of the RSIs is associated with a periodic RS while another one of the other RSIs is associated with an aperiodic RS.

In some embodiments, in the case where the QRI is conveyed to the UE by DCI, the RS associated with the RSI to which the QRI is associated is QCL with the PDSCH DMRS that the DCI schedules.

In some embodiments, in the case where the QRI is conveyed to the UE by MAC-CE, the RS associated with the RSI to which the QRI is associated is QCL with the PDCCH DMRS.

In some embodiments, the QRI indicates one or more QCL parameters including the spatial QCL parameter.

In some embodiments, a periodic RS is a higher layer configured periodic CSI-RS used for beam management measurements or an RS or synchronization sequence in an SS block. In some embodiments, the association between a periodic CSI-RS resource and a QRI is explicitly signaled to the UE using higher layers such as RRC or MAC CE. In some embodiments, the association between an SSB index and a QRI may be explicitly signaled to the UE using higher layers such as RRC or MAC CE. In some embodiments, the association between an SSB index and a QRI is implicit based on initial access procedure. In one embodiment, a pre-defined QRI (e.g. QRI 0), is implicitly associated with the detected SSB in the initial access procedure unless re-configured by higher layers (e.g. RRC or MAC CE).

In some embodiments, an aperiodic RS is a higher-layer configured aperiodic CSI-RS used for beam management measurements. In some embodiments, the association between an aperiodic CSI-RS resource indicator and a QRI is implicitly signaled as referring to the latest measurement performed and/or reported by the UE for the QRI. In one embodiment, the particular QRI are reserved for association with aperiodic RS.

Figure 6:
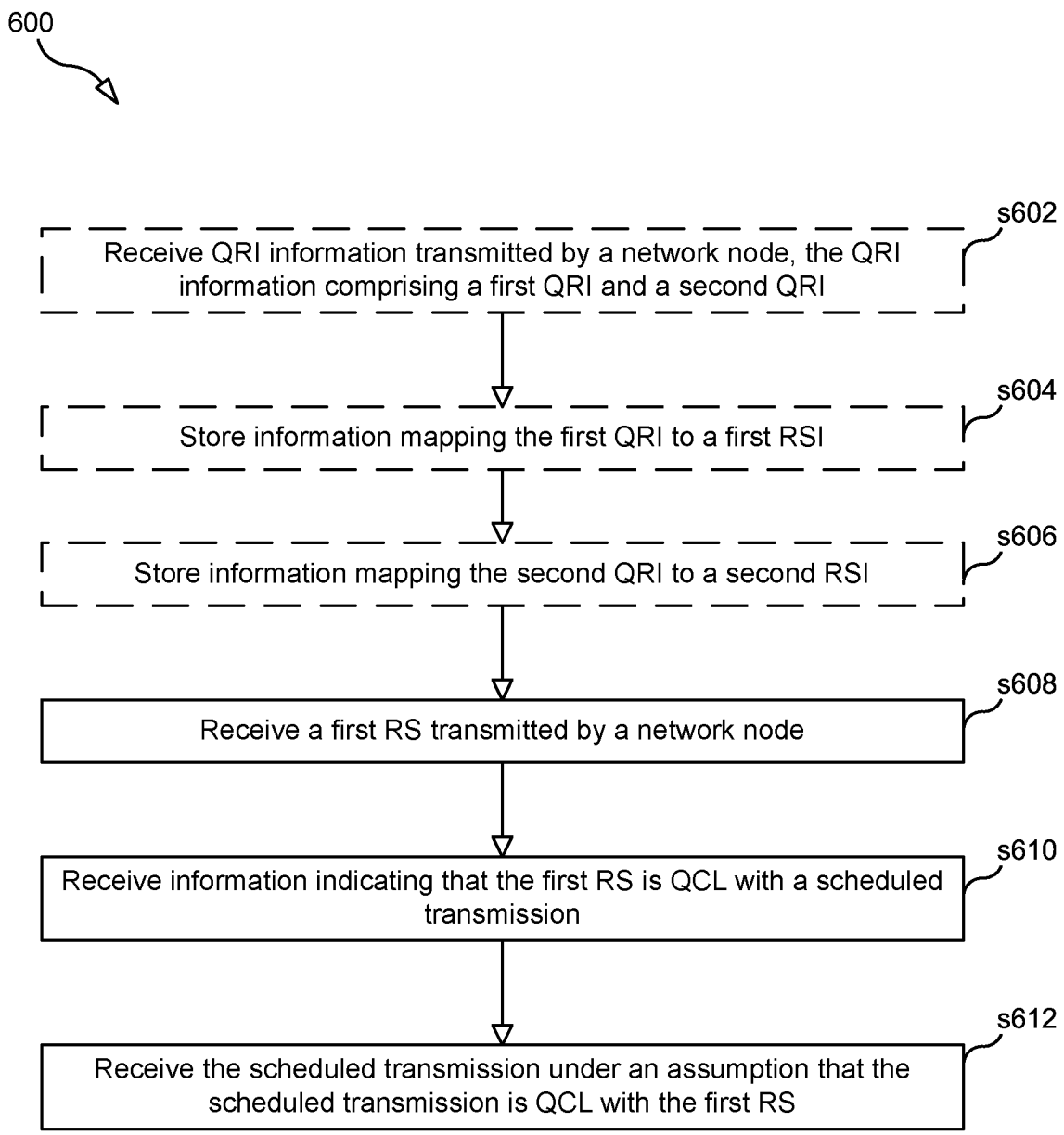
FIG. 6 is a flow chart illustrating a process according to some embodiments.

FIG. 6 is a flow chart illustrating a process 600, according to some embodiments, which is performed by UE 102. In some embodiments, process 600 begins with step s608, in which the UE receives a first RS transmitted by a network node (e.g., TRP 104). In some embodiments, the first RS is one of: a synchronization signal block (SSB) transmission comprising a PBCH with a DMRS, a periodic CSI-RS transmission, and an aperiodic CSI-RS transmission. In some embodiments, the UE performs a measurement on the first RS and transmits to the TRP a report based on the measurement.

In step s610, the UE receives information indicating that the first RS is QCL with a transmission scheduled for the UE. In some embodiments, the scheduled transmission is a RS configured for the wireless device (e.g., a DMRS). In some embodiments, the scheduled transmission is a scheduled PDSCH or PDCCH with an associated demodulation RS, DMRS. In some embodiments, the information comprises at least one QCL parameter.

In some embodiments, the information comprises a quasi-co-location (QCL) indicator, QRI, representing a QRI state selected from a set of available QRI states. In some embodiments, each of the available QRI states is associated with an RS type. In some embodiments, at least one periodic RS type and at least one aperiodic RS type is configurable as the RS type. In some embodiments, at least one QRI state in the set of available QRI states is associated with a periodic RS type and at least one QRI state in the same set is associated with an aperiodic RS type. In some embodiments, one or more of the QRI states in the set of available QRI states is further associated with a RS index, RSI, identifying a transmission of an RS of the RS type with which the QRI state is associated. In some embodiments, the RSI identifying a unique complete transmission of an RS of the RS type which is associated with the QRI state. In some embodiments, the set of available QRI states includes one or more of: a QRI state associated with an explicitly signaled RSI; a QRI state associated with an implicitly signaled RSI. In some embodiments, each QRI state in the set of available QRI states is associated with a periodic RS type, or each QRI state in the set of available QRI states is associated with an aperiodic RS type.

In some embodiments, the method also includes the wireless device storing mapping information that i) associates a first QRI with a first receiver configuration and ii) associates a second QRI to a second receiver configuration, wherein the information indicating that the first reference signal is QCL with the scheduled transmission comprises one of the QRIs. In some embodiments, the wireless device stores information associating the first receiver configuration with a first RSI, the wireless device stores information associating the second receiver configuration with a second RSI, the mapping information associates the first QRI with the first receiver configuration by associating the first QRI with the first RSI, and the mapping information associates the second QRI with the second receiver configuration by associating the second QRI with the second RSI. In some embodiments, the mapping information comprises a table that associates the first QRI with the first RSI and associates the second QRI with the second RSI. In some embodiments, the first RSI comprises at least one of: a time index (e.g., a slot index, a frame index); a CSI-RS resource index, CRI; and/or a SS block (SSB) index.

In some embodiments, the method also includes, prior to the wireless device storing the mapping information, the wireless device receives QRI information associating the first QRI to a first RS type and associating the second QRI to a second RS type. In some embodiments, the first RS type is a periodic RS type (e.g., SSB, p-CSI-RS) and the second RS type is an aperiodic RS type (e.g., a-CSI-RS), the first RS type is a periodic RS type and the second RS type is a periodic RS type, or the first RS type is an aperiodic RS type and the second RS type is an aperiodic RS type. In some embodiments, the QRI information further comprises one of: a first indicator (e.g., "explicit" or 0) indicating that a network node will provide to the wireless device an RSI to which the first QRI should associated, and a second indicator (e.g., "implicit" or 1) indicating that the wireless device should itself determine the RSI to which the first QRI should associated. In some embodiments, the QRI information further comprises one of: a third indicator (e.g., "explicit" or 0) indicating that a network node will provide to the wireless device an RSI to which the second QRI should associated, and a fourth indicator (e.g., "implicit" or 1) indicating that the wireless device should itself determine the RSI to which the second QRI should associated.

In some embodiments, the method also includes the wireless device transmitting a measurement report to a network node; after transmitting the measurement report to the network node, the wireless device receiving from the network node a message comprising an RSI and the first QRI; and after receiving the message, the wireless device storing information associating the QRI with the received RSI.

In some embodiments, the method also includes the wireless device performing measurements and selecting an RSI based on the measurements; and the wireless device, after selecting the RSI, storing information associating the second QRI to the selected RSI.

In some embodiments, the information is received in one or more of: a scheduling message, a layer-2 message, a random access response message, DCI, MAC-CE, RRC.

In some embodiments, the method also includes the wireless device receiving information for triggering the UE to perform measurements with respect to a set of RS transmissions, the triggering information comprising a QRI; the wireless device selecting receiver configuration based on the measurements; and the wireless device storing information associating the QRI with the selected receiver configuration.

In step s612, the UE receives the scheduled transmission under an assumption that the scheduled transmission is QCL with the first RS. In some embodiments, the receiving under the QCL assumption includes processing the scheduled transmission as if it coincided approximately with the first RS regarding one or more of: receive angle of arrival, transmit angle of departure, spatial correlation of receiver antennas, receive beamforming, transmit beamforming. In some embodiments, the receiving under the QCL assumption includes one or more of the following: configuring a receiver arrangement with analog beamforming capabilities; configuring receiver spatial filtering; configuring a timing adjustment.

In some embodiments, process 600 may begin with step s602, in which the UE receives QRI information transmitted by a network node (e.g., TRP 104), where the QRI information comprise a first QRI and a second QRI. The QRI information may also indicate that the first QRI is mapped to a first RS type (e.g., a periodic RS) and the second QRI is mapped to a second RS type (e.g., an aperiodic RS). In step s604, the UE stores information mapping the first QRI to a first RSI. For example, in step s604, the UE may add to a table (or other data structure) a record comprising a first field storing the first QRI and a second field storing the first RSI. In step s606, the UE stores information mapping the second QRI to a second RSI. For example, in step s606, the UE may add to the table a second record comprising a first field storing the second QRI and a second field storing the second RSI.

Figure 7:
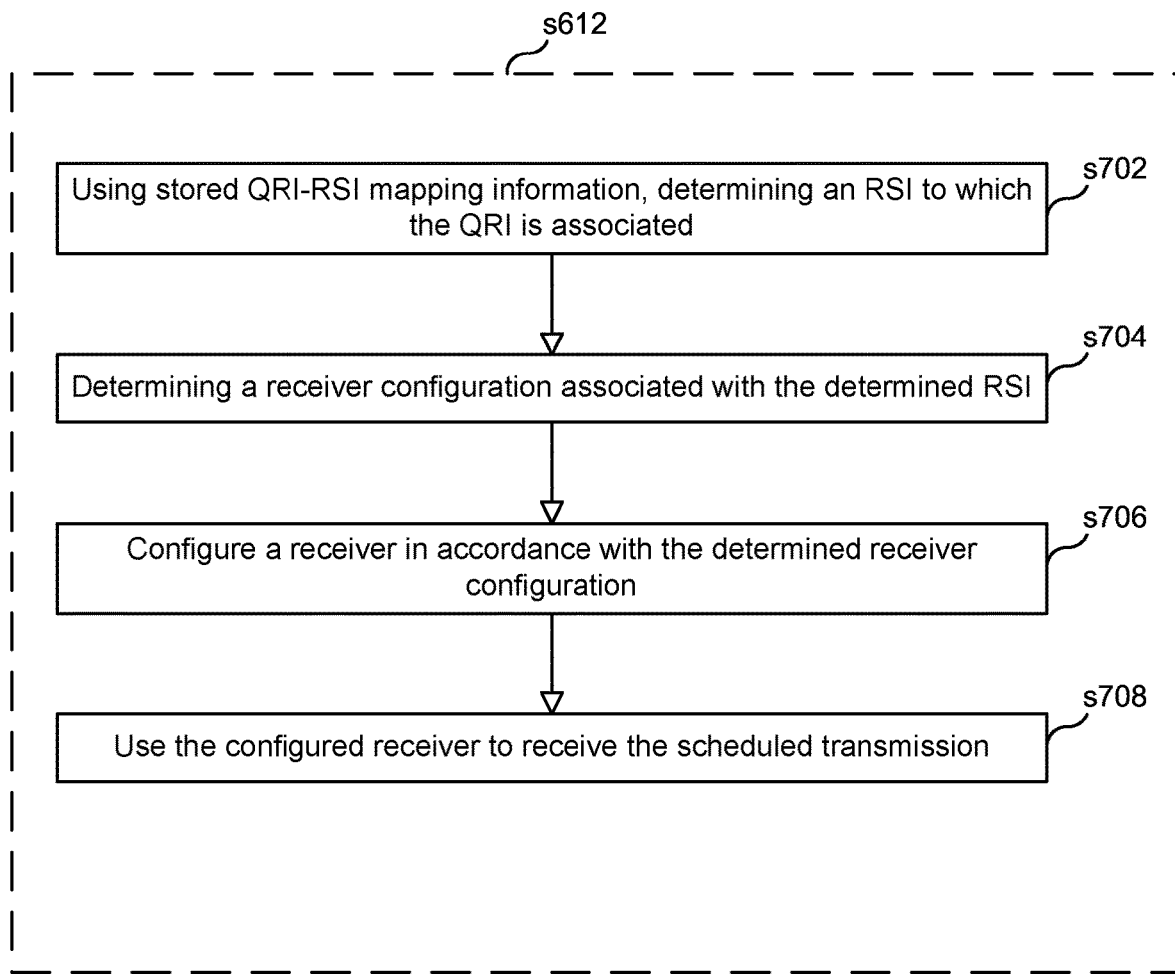
FIG. 7 is a flow chart illustrating a process according to some embodiments.

FIG. 7 illustrates steps that the UE may perform in performing step s612 when the information received in step s610 is a QRI. As shown in FIG. 7, step s612 may include: the UE using stored QRI-RSI mapping information to determine an RSI to which the received QRI is mapped (step s702); the UE determining a receiver configuration associated with the RSI determined in step s702 (step s704); the UE configuring a receiver in accordance with the determined receiver configuration (step s706); and the UE using the configured receiver to receive the scheduled transmission (step s708).

Figure 8:
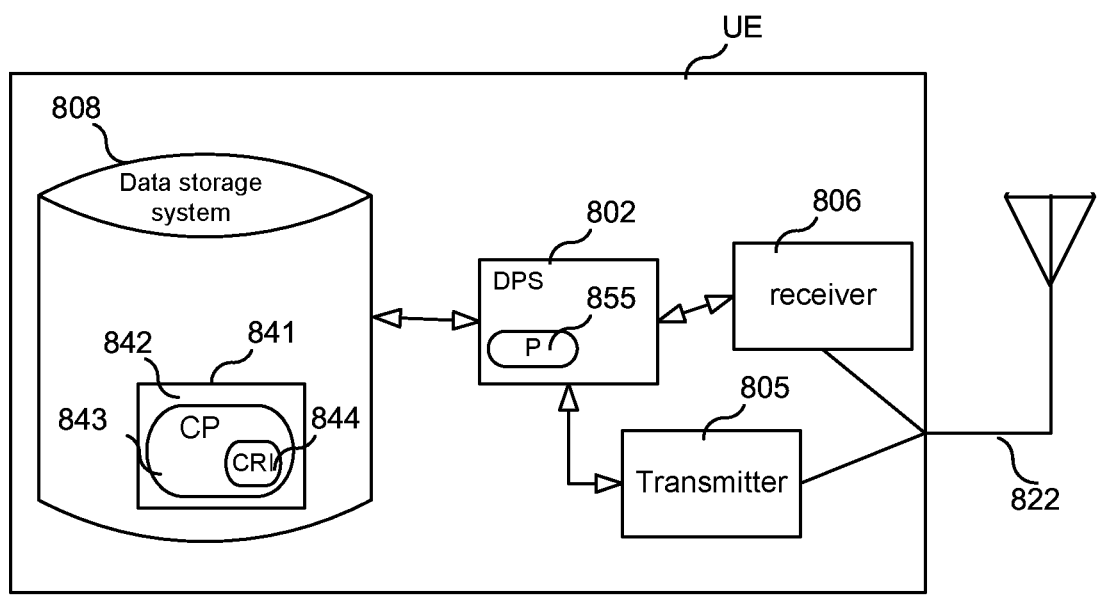
FIG. 8 is a block diagram of a UE according to some embodiments.

FIG. 8 is a block diagram of a UE (e.g., UE 102) according to some embodiments. As shown in FIG. 8, the UE may comprise: a data processing system (DPS) 802, which may include one or more processors 855 (e.g., a general purpose microprocessor and/or one or more other processors, such as an application specific integrated circuit (ASIC), field-programmable gate arrays (FPGAs), and the like); a radio transmitter 805 and a radio receiver 806 coupled to an antenna 822 for use in wirelessly communicating with an access network (AN) node (e.g., TRP 104); and local storage unit (a.k.a., "data storage system") 808, which may include one or more non-volatile storage devices and/or one or more volatile storage devices (e.g., random access memory (RAM)). In embodiments where the UE includes a general purpose microprocessor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, but not limited to, magnetic media (e.g., a hard disk), optical media (e.g., a DVD), memory devices (e.g., random access memory), and the like. In some embodiments, the CRI 844 of computer program 843 is configured such that when executed by data processing system 802, the CRI causes the UE to perform steps described above (e.g., steps described above with reference to the flow charts). In other embodiments, the UE may be configured to perform steps described herein without the need for code. That is, for example, data processing system 802 may consist merely of one or more ASICs. Hence, the features of the embodiments described herein may be implemented in hardware and/or software.

Figure 9:
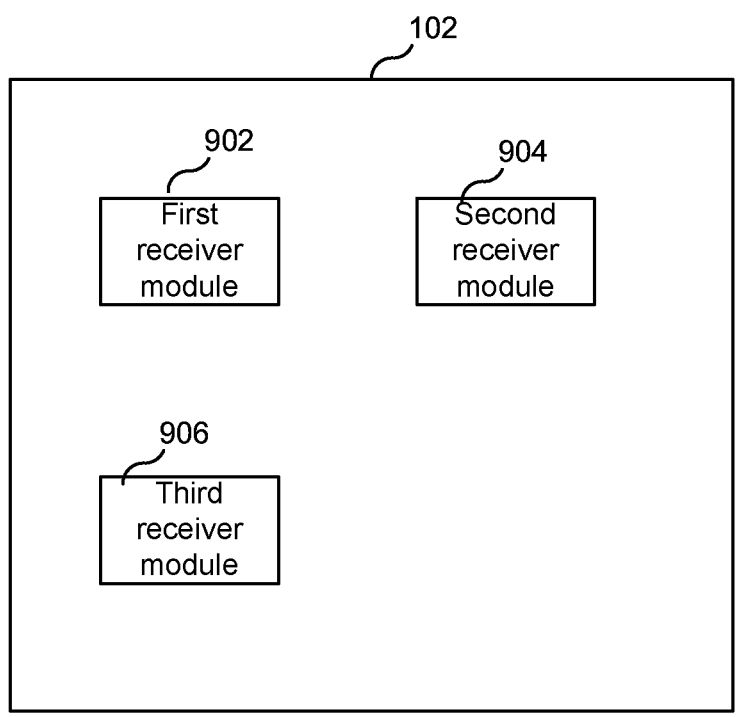
FIG. 9 is a diagram showing functional modules of a UE according to some embodiments.

FIG. 9 is a diagram showing functional modules of a UE (e.g., UE 102) according to some embodiments. As shown in FIG. 9, the UE includes: a first receiver module 902 configured to employ receiver 806 to receive a first RS; a second receiver module 904 configured to employ the receiver to receive, before or after or while receiving the first RS, information indicating that the first RS is quasi-co-located, QCL, with a scheduled transmission; and a third receiver module 906 configured to employ the receiver to receive the scheduled transmission under an assumption that the scheduled transmission is QCL with the first RS.

Figure 10:
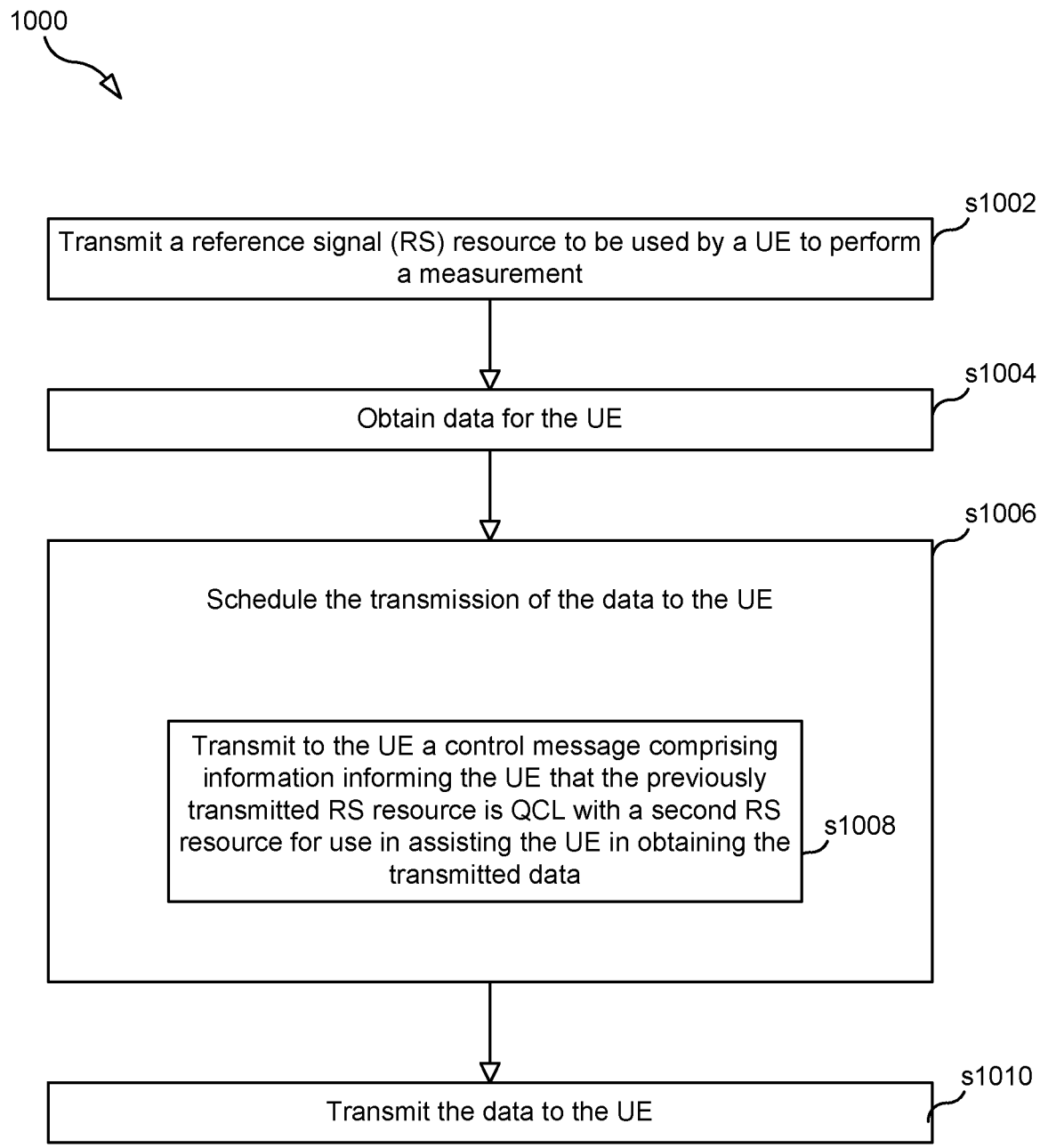
FIG. 10 is a flow chart illustrating a process according to some embodiments.

FIG. 10 is a flow chart illustrating a process 1000, according to some embodiments, which is performed by one or more nodes of an access network. Process 1000 may start with step s1002, in which the access network transmits a reference signal (RS) resource to be used by a UE to perform a measurement. In step s1004, the access network obtains data for the UE (e.g., the access network may receive the data from another network, such as a core network, or the access network may itself generate the data). In step s1006, the access network schedules the transmission of the data to the UE. In step s1010, the access network transmits the data to the UE. Scheduling the transmission of the data to the UE comprises the access network transmitting a control message (e.g., a DCI or a MAC-CE) to the UE, the control message comprising information informing the UE that the previously transmitted RS resource is QCL with a second RS resource for use in assisting the UE in obtaining the transmitted data (e.g., a demodulation RS (DMRS)) (step s1008).

In some embodiments, wherein the information comprises a QCL Reference Indicator (QRI) for enabling the UE to select a receiver configuration associated with the previously transmitted RS resource. In some embodiments, the QRI is 2 or 3 bits in length. In some embodiments, the method also includes, prior to scheduling the transmission, selecting an RS index and transmitting to the UE a message associating the QRI with the selected RS index. In some embodiments, selecting the RS index comprises selecting the RS index based on one or more measurements reported by the UE. In some embodiments, the method also includes, prior to scheduling the transmission, transmitting to the UE information for triggering the UE to perform measurements with respect to a set of RS transmissions, the information comprising the QRI so that the UE can associate with the QRI a selected receiver configuration selected by the UE based on the measurements. In some embodiments, the set of RS transmissions consists of transmissions of an aperiodic RS.

In some embodiments, transmitting the data to the UE comprises using a first transmit, TX, beam to transmit the data to the UE. The method may also include: transmitting a second RS resource; obtaining second data for the UE; deciding to use a second TX beam to transmit the second data to the UE; scheduling the transmission of the second data to the UE; and transmitting the second data to the UE, wherein scheduling the transmission of the second data to the UE comprises transmitting a second control message (e.g., a DCI or a MAC-CE) to the UE, the second control message comprising information informing the UE that the previously transmitted second RS resource is QCL with a third RS resource for use in assisting the UE in obtaining the transmitted second data. In some embodiments, the second RS resource is an aperiodic RS resource, the second TX beam is narrower than the first TX beam, and the first TX beam is more robust than the second TX beam.

Figure 11:
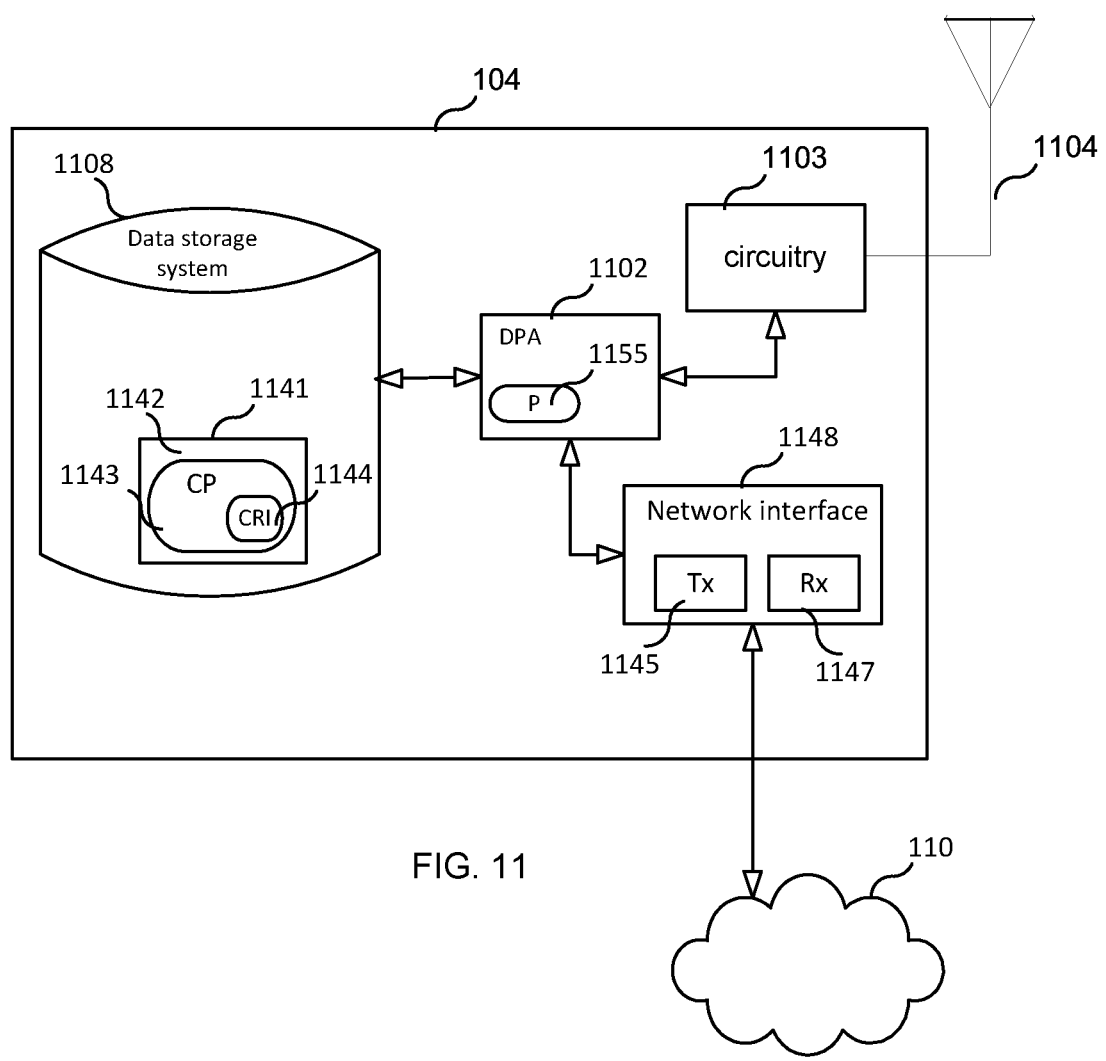
FIG. 11 is a block diagram of a TRP according to some embodiments.

FIG. 11 is a block diagram of a TRP (e.g., TRP 104) according to some embodiments. As shown in FIG. 11, the TRP may comprise: a data processing apparatus (DPA) 1102, which may include one or more processors (P) 1155 (e.g., a general purpose microprocessor and/or one or more other processors, such as an application specific integrated circuit (ASIC), field-programmable gate arrays (FPGAs), and the like); a network interface 1148 comprising a transmitter (Tx) 1145 and a receiver (Rx) 1147 for enabling the network node to transmit data to and receive data from other nodes connected to a network 110 (e.g., an Internet Protocol (IP) network) to which network interface 1148 is connected; circuitry 1103 (e.g., radio transceiver circuitry) coupled to an antenna system 1104 for wireless communication with UEs); and local storage unit (a.k.a., "data storage system") 1108, which may include one or more non-volatile storage devices and/or one or more volatile storage devices (e.g., random access memory (RAM)). In embodiments where DPA 1102 includes a general purpose microprocessor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, but not limited to magnetic media (e.g., a hard disk), optical media, memory devices (e.g., random access memory), and the like. In some embodiments, the CRI 1144 of computer program 1143 is configured such that when executed by data processing apparatus 1102, the CRI causes the TRP to perform steps described herein (e.g., steps described herein with reference to the flow charts and/or message flow diagrams). In other embodiments, the TRP may be configured to perform steps described herein without the need for code. That is, for example, DPA 1102 may consist merely of one or more ASICs. Hence, the features of the embodiments described herein may be implemented in hardware and/or software.

Figure 12:
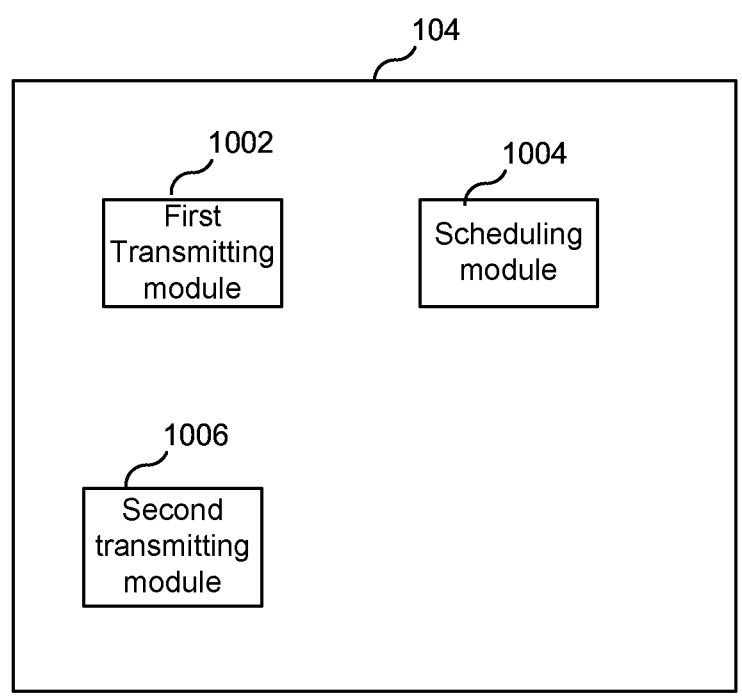
FIG. 12 is a diagram showing functional modules of a TRP according to some embodiments.

FIG. 12 is a diagram showing functional modules of a TRP (e.g., TRP 104) according to some embodiments. As shown in FIG. 10, the TRP includes: a first transmitting module 1202 configured to employ a transmitter to transmit a reference signal (RS) resource to be used by a UE to perform a measurement; a scheduling module 1204 for scheduling the transmission of data to the UE; and a second transmitting module 1206 configured to employ the transmitter to transmit the data to the UE. The scheduling module 1204 is configured to schedule the transmission of the data to the UE by performing a process comprising transmitting a control message (e.g., a DCI or a MAC-CE) to the UE, the control message comprising information informing the UE that the previously transmitted RS resource is QCL with a second RS resource for use in assisting the UE in obtaining the transmitted data (e.g., a demodulation RS (DMRS)).

Figure 13:
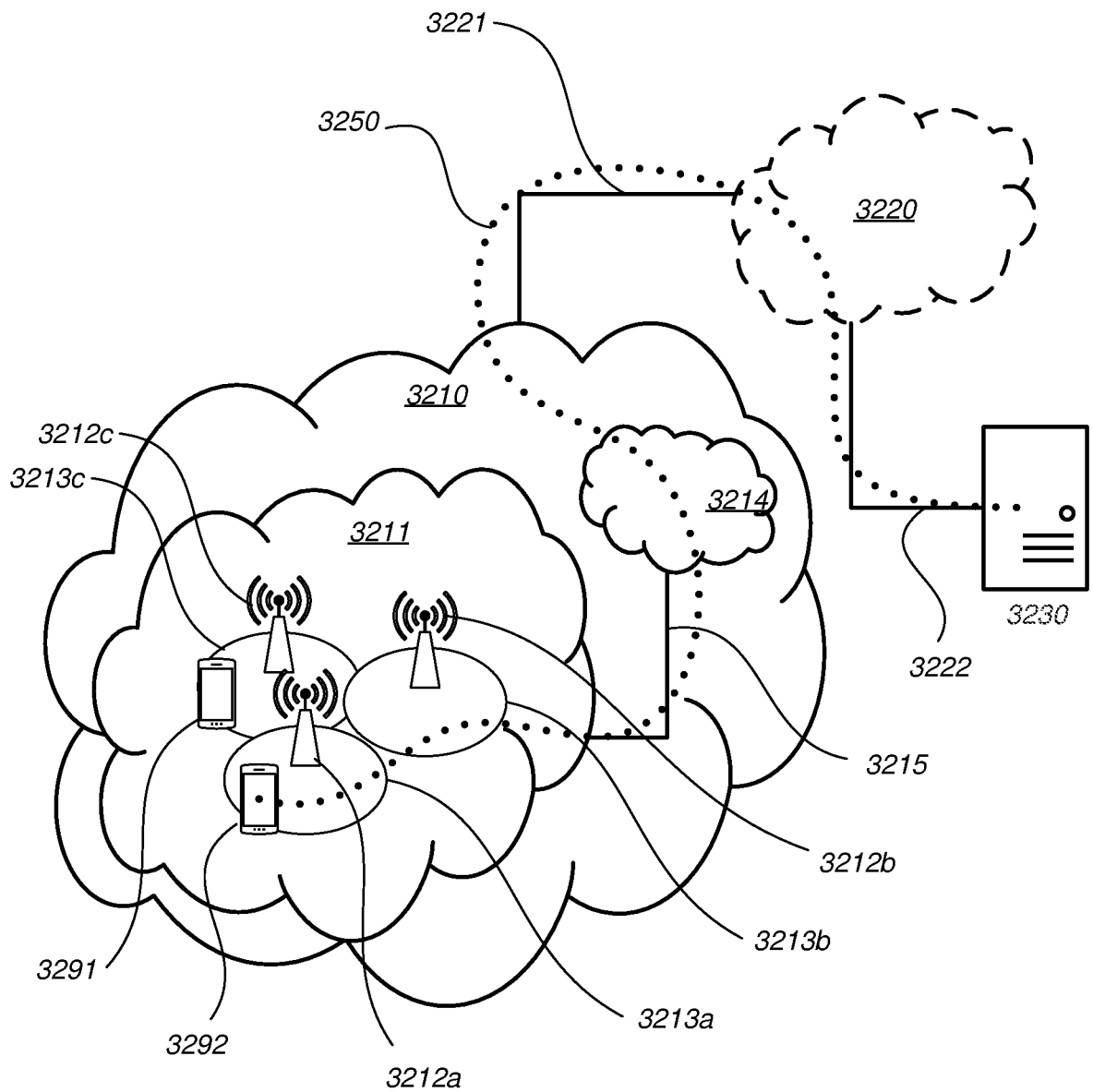
FIG. 13 schematically illustrates a telecommunication network connected via an intermediate network to a host computer.

With reference to FIG. 13, in accordance with an embodiment, a communication system includes a telecommunication network 3210 (e.g., a 3GPP-type cellular network) that comprises an access network 3211 (e.g., a 3GPP radio access network), and a core network 3214. The access network 3211 comprises a plurality of TRPs 3212a, 3212b, 3212c, such as NBs, eNBs, gNBs or other types of wireless access points, each defining a corresponding coverage area 3213a, 3213b, 3213c. Each TRP 3212a, 3212b, 3212c is connectable to the core network 3214 over a wired or wireless connection 3215, and each TRP may be configured to implement the same functionality as TRP 104. A first user equipment (UE) 3291 located in coverage area 3213c is configured to wirelessly connect to, or be paged by, the corresponding TRP 3212c. A second UE 3292 in coverage area 3213a is wirelessly connectable to the corresponding TRP 3212a. While a plurality of UEs 3291, 3292 are illustrated in this example, the disclosed embodiments are equally applicable to a situation where a sole UE is in the coverage area or where a sole UE is connecting to the corresponding TRP 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 13 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a TRP 3212 may not or need not be informed about the past routing of an incoming downlink communication with data originating from a host computer 3230 to be forwarded (e.g., handed over) to a connected UE 3291. Similarly, the TRP 3212 need not be aware of the future routing of an outgoing uplink communication originating from the UE 3291 towards the host computer 3230.

Example implementations, in accordance with an embodiment, of the UE, TRP and host computer discussed in the preceding paragraphs will now be described with reference to FIG. 14. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330, which includes the same functionality described herein with respect to UE 102, connecting via an OTT connection 3350 terminating at the UE 3330 and the host computer 3310. In providing the service to the remote user, the host application 3312 may provide user data which is transmitted using the OTT connection 3350.

The communication system 3300 further includes a TRP 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 14) served by the TRP 3320. The communication interface 3326 may be configured to facilitate a connection 3360 to the host computer 3310. The connection 3360 may be direct or it may pass through a core network (not shown in FIG. 14) of the telecommunication system and/or through one or more intermediate networks outside the telecommunication system. In the embodiment shown, the hardware 3325 of the TRP 3320 further includes processing circuitry 3328, which may comprise one or more programmable processors, application-specific integrated circuits, field programmable gate arrays or combinations of these (not shown) adapted to execute instructions. The TRP 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a TRP serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 14:
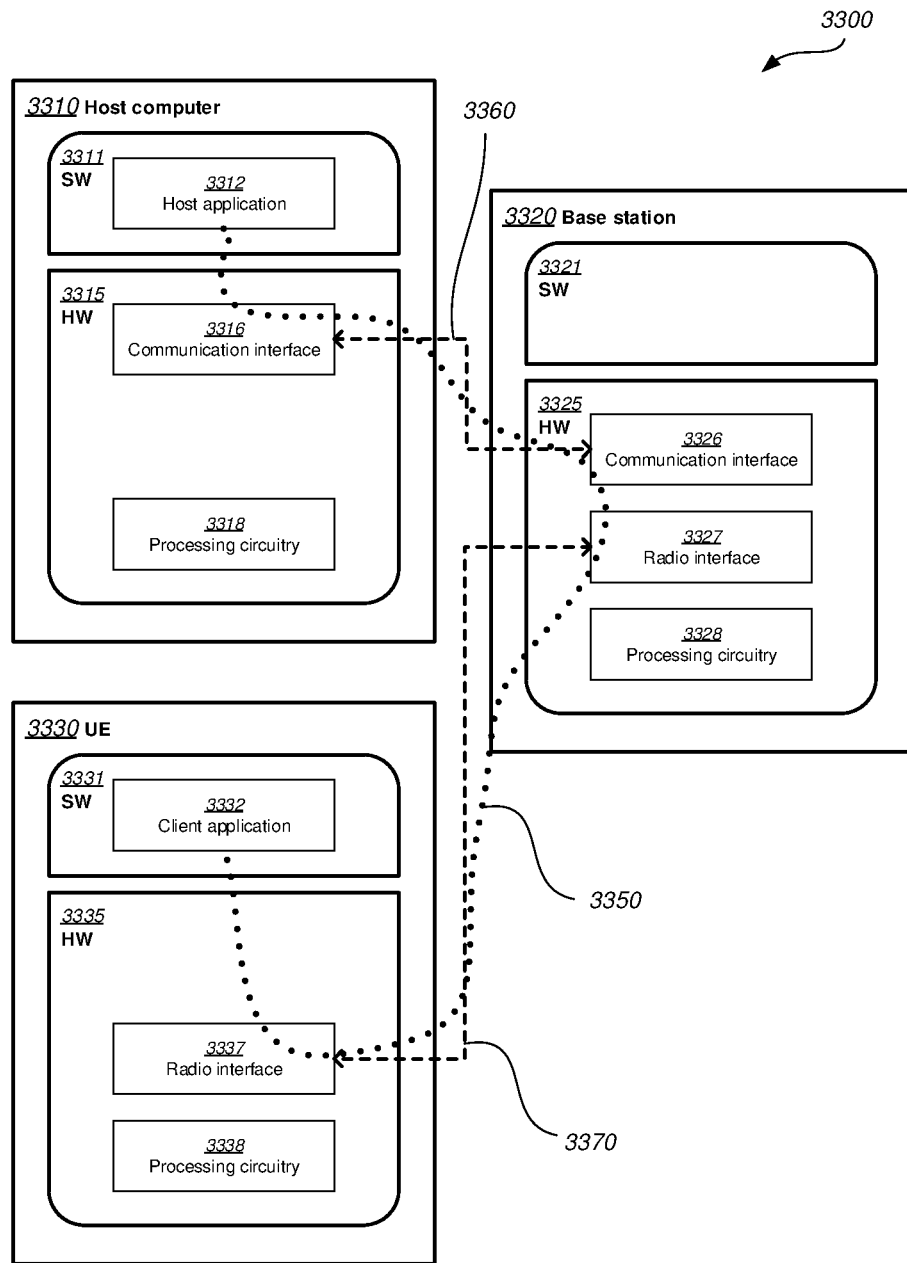
FIG. 14 is a generalized block diagram of a host computer communicating via a base station with a user equipment over a partially wireless connection.

It is noted that the host computer 3310, TRP 3320 and UE 3330 illustrated in FIG. 14 may be identical to the host computer 3230, one of the TRPs 3212a, 3212b, 3212c and one of the UEs 3291, 3292 of FIG. 13, respectively. This is to say, the inner workings of these entities may be as shown in FIG. 14 and independently, the surrounding network topology may be that of FIG. 13.

In FIG. 14, the OTT connection 3350 has been drawn abstractly to illustrate the communication between the host computer 3310 and the use equipment 3330 via the TRP 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the TRP 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, as seen above, the teachings of these embodiments improve network performance by enabling a TRP to transmit a beam indication (e.g., a QRI) to a UE, which is configured to use the beam indication to determine an advantageous receiver configuration with which the beam information is associated and use the determined receiver configuration to receive data transmitted by the TRP, thereby provide benefits such as reduced overheard, reduced latency, improved received signal quality.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the TRP 3320, and it may be unknown or imperceptible to the TRP 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 15:
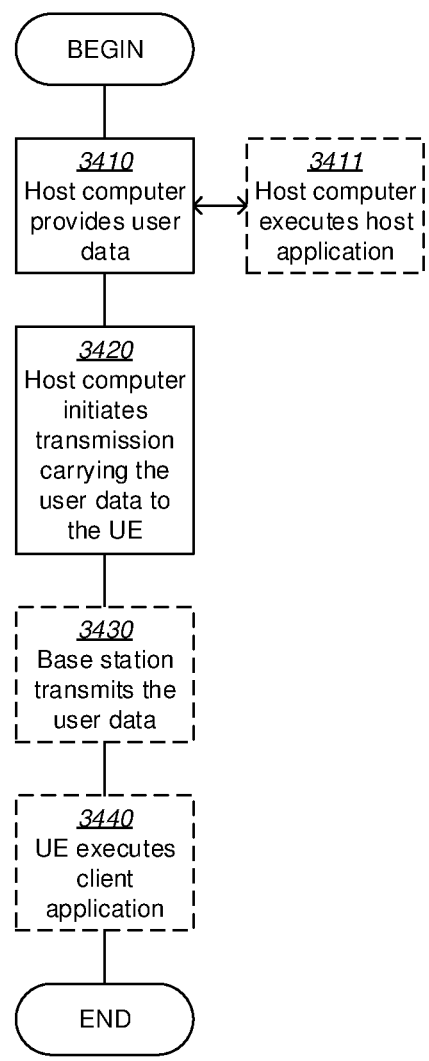
FIG. 15 is a flowchart illustrating a method implemented in a communication system including a host computer, a base station and a user equipment.

FIG. 15 is a flowchart illustrating a method implemented in a communication system, in accordance with one embodiment. The communication system includes a host computer, a TRP and a UE which may be those described with reference to FIGS. 13 and 14. For simplicity of the present disclosure, only drawing references to FIG. 15 will be included in this section. In a first step 3410 of the method, the host computer provides user data. In an optional sub step 3411 of the first step 3410, the host computer provides the user data by executing a host application. In a second step 3420, the host computer initiates a transmission carrying the user data to the UE. In an optional third step 3430, the TRP transmits to the UE the user data which was carried in the transmission that the host computer initiated, in accordance with the teachings of the embodiments described throughout this disclosure (e.g., in scheduling the transmission of the user data (or portion thereof) to the UE, the TRP may indicate a QRI to the UE to enable the UE to select an advantageous receiver configuration for use in receiving the user data (e.g., for use in receiving a DMRS)). In an optional fourth step 3440, the UE executes a client application associated with the host application executed by the host computer.

Figure 16:
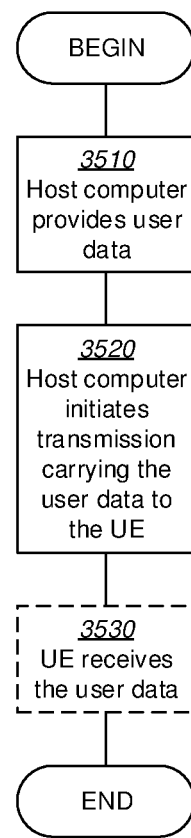
FIG. 16 is a flowchart illustrating a method implemented in a communication system including a host computer, a base station and a user equipment.

FIG. 16 is a flowchart illustrating a method implemented in a communication system, in accordance with one embodiment. The communication system includes a host computer, a TRP and a UE which may be those described with reference to FIGS. 13 and 14. For simplicity of the present disclosure, only drawing references to FIG. 16 will be included in this section. In a first step 3510 of the method, the host computer provides user data. In an optional sub step (not shown) the host computer provides the user data by executing a host application. In a second step 3520, the host computer initiates a transmission carrying the user data to the UE. The transmission may pass via the TRP, in accordance with the teachings of the embodiments described throughout this disclosure. In an optional third step 3530, the UE receives the user data carried in the transmission.

This application claims priority to a prior filed provisional application that included an appendix containing a document (a.k.a., "contribution") for discussion and decision at a 3GPP meeting. The relevant portions of the contribution are reproduced below:

1. Introduction

Table 3 below contains agreements have been made related to beam indication:

TABLE 3

Agreement 1:

RAN1 to study the relation (if any) between a
measurement and/or reporting on a reference
signal and a subsequent beam indication for
beam management purposes
    Study the indicator(s) used for PDCCH and PDSCH
    Study whether there is a relationship between
    the indicator types e.g. same type of
    indicator or different types Agreement 2:

Aim for low-overhead indication for spatial
QCL assumption to assist UE-side
beamforming/receiving
    FFS details (e.g., tag-based where the tag refers
    to previous CSI-RS resources, BPL-
    based, referring to previous measurement
    reports, indication one resource (set) out of
    multiple resource (set)s configured by RRC,
    CSI-RS resource/port index based, etc.)

Agreement 3:

For reception of unicast DL data channel,
support indication of spatial QCL assumption
between DL RS antenna port(s) and DMRS antenna
port(s) of DL data channel: Information
indicating the RS antenna port(s) is indicated
via DCI (downlink grants)
    The information indicates the RS antenna port(s)
    which is QCL-ed with DMRS antenna port(s)
        FFS: Indication details
            E.g. explicit indication of RS port/resource
            ID, or implicitly derived
    . . .

Agreement 4:

. . .
Configuration of QCL for UE specific NR-PDCCH
is by RRC and MAC-CE signaling
    Note that MAC-CE is not always needed
    FFS: necessity of DCI signaling TABLE 3-continued Note: For example, DL RS QCLed with DMRS of PDCCH for delay spread, Doppler spread, Doppler shift, and average delay parameters, spatial parameters In this contribution, we elaborate on the relation between a measurement and/or reporting on a reference signal and a subsequent beam indication for beam management purposes, as suggested in Agreement #1.

2. Discussion on Slow RAN1 Progress on Beam Indication

Agreement #1 above from the previous meeting states that RAN1 should study the relation between measurement and/or reporting on a reference signal and subsequent beam indication, despite the fact that beam indication has been discussed now for many meetings. The other agreements above capture the fact that beam indication is supported for both PDCCH and PDSCH, and they capture what signals (DCI or MAC-CE) should be used to convey beam indication. However, what is lacking is a concrete agreement on a detailed design for the beam indication message itself, and how exactly the message should be interpreted by the UE. Although these agreements were made several meetings ago there has not been any significant progress.

Observation 1: The most important missing agreement in beam management discussions is how the UE should interpret the beam indication, i.e., what does it refer to?

One of the complicating factors may be that beam management may be based on different types of reference signals. CSI-RS has been agreed, and this can be configured in several ways: aperiodic (a-CSI-RS), semi-persistent, or periodic (p-CSI-RS). Periodically transmitted SSB is also being discussed. Each signal type adds a slightly new twist to the beam indication issue. While different companies have different views on how the RSs should be configured and how beam management procedures should work, there appears to be at least one common thread. The purpose of signalling a beam related indicator to the UE in either DCI (e.g., for PDSCH) or MAC-CE (e.g., for PDCCH) is to help the UE to set its analog Rx beam to receive the PDCCH/PDSCH. Such an indicator can thus be seen as a spatial QCL indicator, consistent with Agreements 2, 3, and 4 above.

3. Beam Indicator Definition

In the design of a suitable beam indication message, we adopt the terminology QRI=QCL Reference Indicator. A QRI informs the UE about which particular previously transmitted reference signal resource (SSB, p-CSI-RS, or a-CSI-RS) the DMRS is spatially QCL with for the purposes of PDSCH/PDCCH reception. In this contribution, we propose that QRI may be used for beam indication for various different reference signal types in a consistent way. In some sense, this is analogous to the PQI bits in DCI format 2D in LTE which also indicate a QCL assumption to a reference signal (periodic). Note that in previous contributions we referred to a measurement indicator (MI) in our discussions on beam indication; however, we believe that the term QRI is more meaningful.

Observation 2: Beam indication through a QCL reference indicator (QRI) is analogous to PQI indication in DCI format 2D in LTE which also indicates a QCL assumption to a reference signal.

At its heart, a QRI points to the index of an RS resource, which the UE used for measurements at some prior point in time. Since measurements for beam management may be performed on RSs of various different types, e.g., periodic CSI-RS, aperiodic CSI-RS, SSB (if agreed), we propose that different QRI states refer to different RS types as illustrated in the example table show in FIG. 17. For example, one QRI state could be associated with the preferred SSB index determined during the RACH procedure performed during initial access, e.g., QRI=0. Several states could be associated with indices of p-CSI-RS resources or SSB indices measured and/or reported during a P1 or P2 procedure. Finally, several states could be associated with indices of a-CSI-RS resources measured and/or reported during a P2 or P3 procedure.

This flexibility allows for the network to deploy any combination of reference signals, and still use the same type of beam indication. One network could deploy only periodic CSI-RS, and base beam indication only on that. Another network may deploy only aperiodic CSI-RS, and base indication on those. Providing that beam management based on SSBs is agreed, one network could use only SSBs for beam management purposes, and base beam indication on references to SSBs. Furthermore, a network may use any combination of SSBs, p-CSI-RS and a-CSI-RS, and still use the same beam indication signalling.

Such flexibility further allows for the network to dynamically switch from transmitting data/control in wider, more robust beams, e.g., based on measurements of SSB or p-CSI-RS to narrower, UE specific refined beams, e.g., based on measurements of a-CSI-RS when they are available. This flexibility also allows fallback to the more robust beams if the UE specific beams based on aperiodic measurements become outdated. Furthermore, such flexibility can allow data/control to be transmitted over different beams, e.g., PDCCH on wider, more robust beams and PDSCH on narrower, more refined beams.

While gNB flexibility is desired for beam indication based on QRI, this must be balanced with overhead. This is particularly true since beam indication for PDSCH has been agreed to be carried on DCI (Agreement #3). This low overhead requirement is also pointed out in Agreement #2. For this reason, we propose that the number of bits to signal QRI is chosen to be quite small. For example, 3 bits could allow up to 8 different QRI states. This could allow 2 or 3 states each corresponding to p-CSI-RS, SSB, and a-CSI-RS. Of course, if the network is designed to use only p-CSI-RS, all 8 QRI states could be used to indicate periodic CSI-RS resources.

Beam indication based on QRI essentially consists of a mapping, or re-indexing, of the RS indices (CRI or SSB indices) from a larger index space to a much smaller index space (QRI states). For example, in the case of periodic transmission of a large number of periodic RS resources (large beam sweep), say with 64 beams, the index space is reduced from 6 bits down to the smaller number used for QRI, e.g., 3. For aperiodic RS (a-CSI-RS), the number of resources in a set is not typically as large, hence the index space reduction is not as important itself; however, the remapping is still inherent (and important) through an implicit association of a CRI to a QRI through measurements performed by the UE as described next.

A key difference between QRI states corresponding to periodic RS resources (p-CSI-RS, SSB) and those corresponding to aperiodic RS resources (a-CSI-RS) is how the UE is informed of the RS index associated with a given QRI state, i.e. CRI/SSB index to QRI association. In the former case (periodic), the association can be signalled to the UE explicitly, e.g., through higher layers (RRC or MAC-CE, depending on latency requirements) based on prior measurements and/or reports provided to the gNB from the UE. For the latter case (aperiodic), the association need not be signalled to the UE explicitly. Rather it can be determined implicitly based on the most recent measurement on a set of aperiodic CSI-RS resources. This suggests that the message triggering the aperiodic measurement should include the QRI so that the UE knows to what QRI it should associate a preferred RS index. In other words, this informs the UE on what beam pair link is being updated.

FIG. 17 shows an example of the implicit/explicit distinction for different QRI states. Explicit and implicit association will be elaborated on in the next two sections. In either case, however, the key is that the UE remembers a receiver configuration, e.g., spatial Rx configuration (or Rx beam), corresponding to the RS index which is associated with the QRI based on a prior measurement and/or report on this RS resource. In this way, when QRI is received at a later point in time, the UE can use the stored configuration to aid in reception of PDCCH/PDSCH.

FIG. 1 shows an example of several different QRI states that could be configured in the case that QRI consists of 3 bits. The first state could be used, for example, for indication of the best beam discovered during the RACH procedure during initial access. If the UE is configured to report L1-RSRP based on periodically transmitted SSB, then QRI states 1 and 2 may be used for indication of good beams according to the RSRP reports. QRI states 3, 4, and 5 could be used based on similar measurement and/or reporting based on periodically transmitted CSI-RS (p-CSI-RS). Finally, QRI states 6 and 7 could be used for indication of the preferred beams measured and/or reported based on aperiodically transmitted CSI-RS (a-CSI-RS). As discussed in the next section, QRI states 1-5 require explicit signalling of the reference signal index-to-QRI association to the UE based on prior measurements/reporting of these RSs.

Based on the above discussion, we propose the following:

Proposal 1: NR supports signalling an X-bit QCL reference indicator (QRI) for beam indication purposes for both PDCCH and PDSCH. Different QRI states correspond to either periodically transmitted reference signals (e.g., CSI-RS, SSB) or aperiodically transmitted CSI-RS. For PDSCH, signalling of QRI is over DCI. For PDCCH, signalling method is FFS, e.g, DCI or MAC-CE depending on signalling latency requirements. X is FFS, e.g., 3.

3.1 Explicit Reference Signal Index-to-QRI Association

Figure 18:
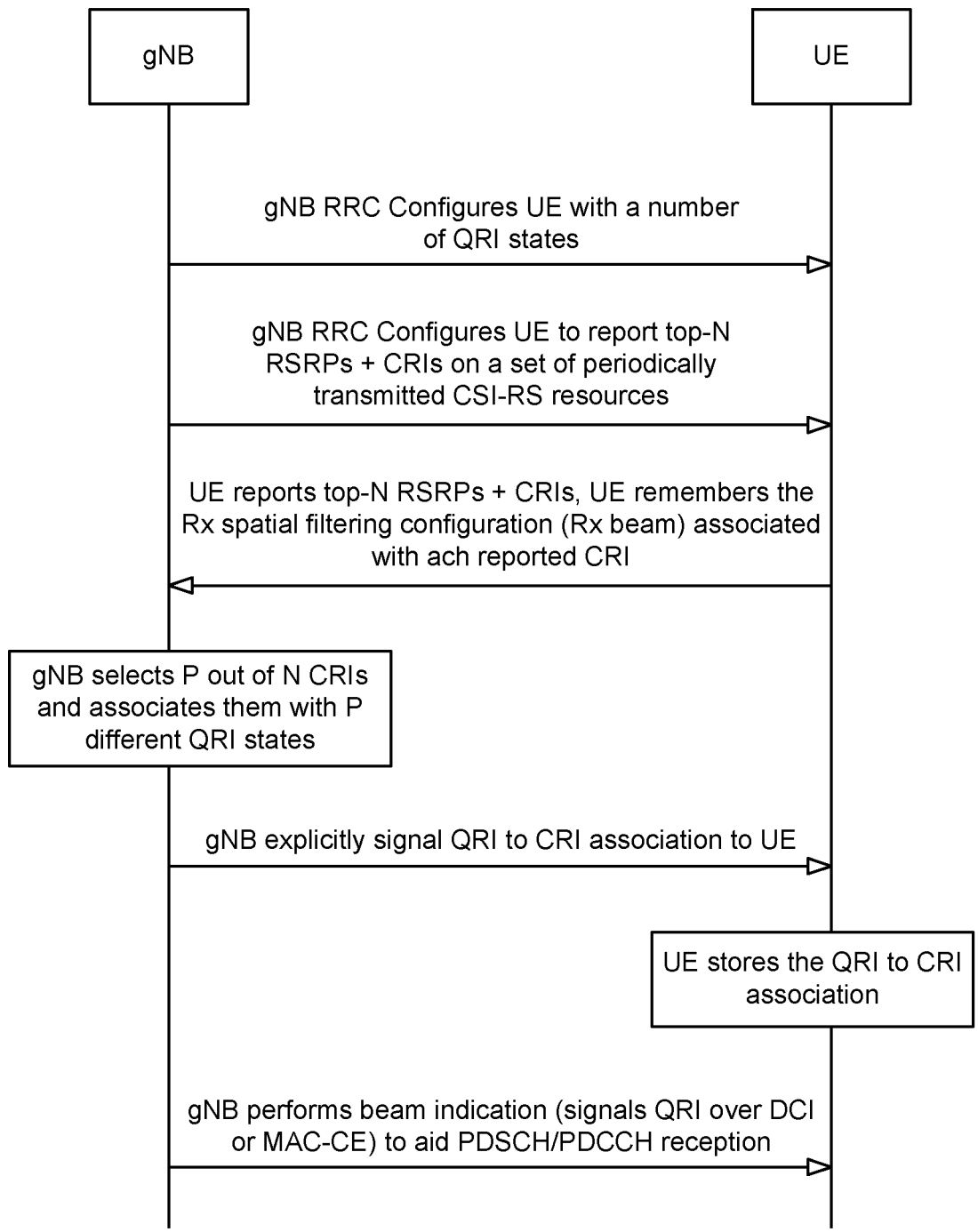
FIG. 18 provides an example of explicit signalling of CRI-to-QRI association for the case of periodically transmitted CSI-RS (p-CSI-RS).

Periodic beam sweeps, either based on a large number of SSBs (up to 64 allowed for mmWave) or a large number of periodic CSI-RS resources may be used, for example, during a P1 procedure. The UE is typically configured to periodically report the N largest RSRPs and corresponding reference signal indices, e.g., CRI in the case of p-CSI-RS. Since the index space of CRI is necessarily large if the number of measured resources is large, CRI itself is not suitable for beam indication since it requires too many bits. Beam indication overhead can be reduced instead if a subset of the reported CRIs are associated with a small number of configured QRI states (one CRI per QRI state). The choice of the subset of N reported CRIs is up to the gNB. However, once the association is made, it can be explicitly signalled to the UE. This allows future beam indication based on QRI since the UE remembers the receiver configuration, e.g., Rx spatial configuration (Rx beam), associated with reach reported CRI. When a QRI is received at a later point, the Rx spatial configuration can be retrieved since the UE knows the association of QRI to CRI. This process is exemplified in FIG. 18. Note that the UE assumes that the CRI-to-QRI association remains valid until it is updated at a later time. Updates are required, e.g., to track UE movement/rotation which resulting in a change of the suitable beams. Clearly, the required update frequency depends on how fast the UE is moving.

Proposal 2: To enable beam QRI-based beam indication, NR supports explicit signalling of reference signal index-to-QRI association to a UE for the case of a set of periodically transmitted reference signals, e.g., CSI-RS, SSB. FFS: signalling method, e.g., RRC, MAC-CE depending on signalling latency requirements.

3.2 Implicit Reference Signal Index-to-QRI Association

Aperiodically triggered beam sweeps, typically based on a relatively small set of aperiodic CSI-RS resources, may be used, for example, during a P2 or P3 procedure for UE-specific beam refinement purposes. Depending on the set size and the specific beam management procedure, the UE may or may not be configured to report RSRP/CSI+CRI. In either case, the UE may determine a preferred CRI based on the measurements regardless of whether the UE is selecting amongst CSI-RS resources for the purposes of reporting a preferred Tx beam (P2) or adjusting its own Rx beam (P3).

Figure 19:
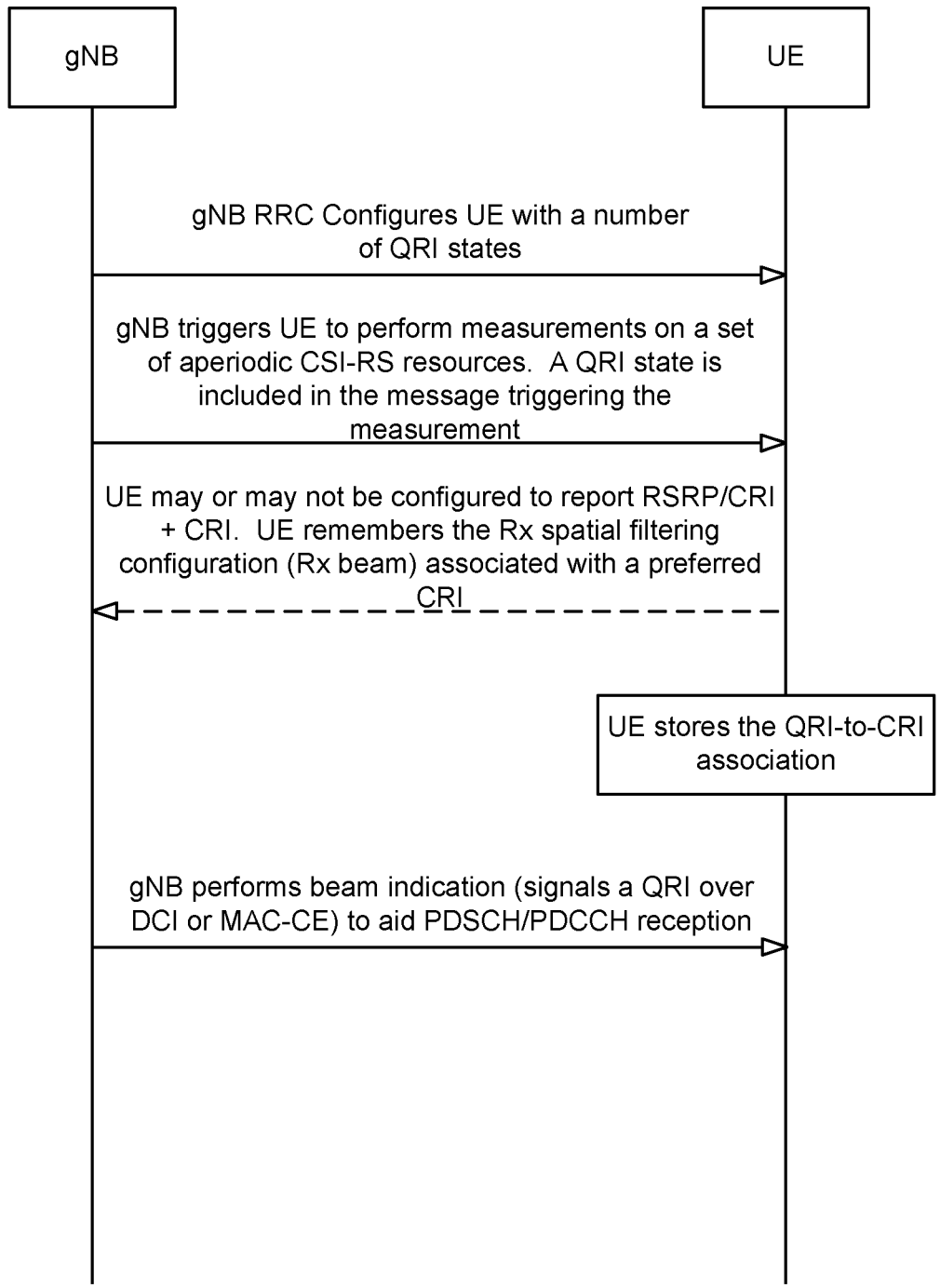
FIG. 19 illustrates implicit signalling of CRI-to-QRI association for the case of aperiodically transmitted CSI-RS (a-CSI-RS).

In the case of aperiodic CSI-RS measurements, it is desirable to update the CRI-to-QRI association quickly, such that a refined beam can be indicated by the gNB as soon as possible. Hence, it is not desirable to wait for the gNB to explicitly signal the association, since such an association could typically happen on a relatively slow basis (compare to the case of p-CSI-RS). To avoid this, the gNB may include one of the configured QRI states corresponding to aperiodic CSI-RS in the message that dynamically triggers the aperiodic CSI-RS measurement. In this way, as soon as the UE determines a preferred CSI-RS resource (preferred CRI), the CRI-to-QRI association is made. In this sense, the reference signal index-to-QRI mapping is signalled to the UE implicitly. The association is based on the most recent measurement performed on a set of resources in which the measurement trigger contains that QRI state. As soon as the QRI association is made, that QRI state is now available for beam indication purposes. This process is exemplified in FIG. 19. Note that the UE assumes that the CRI-to-QRI association remains valid until the next time a measurement is triggered based on the same QRI state.

Proposal 3: To enable QRI-based beam indication, NR supports signalling of a QRI state within the DCI that dynamically triggers a UE measurement on a set of aperiodic CSI-RS resources. The UE determines the CRI-to-QRI association based on the determination of a preferred CSI-RS resource.

4. Conclusions

In this contribution, we observe the following:

Observation 1: the most important missing agreement in beam management discussions is how the UE should interpret the beam indication, i.e., what does it refer to?

Observation 2: Beam indication through a QCL reference indicator (QRI) is analogous to PQI indication in DCI format 2D in LTE which also indicates a QCL assumption to a reference signal.

Based on the discussion in this contribution we propose the following:

Proposal 1: NR supports signalling an X-bit QCL reference indicator (QRI) for beam indication purposes for both PDCCH and PDSCH. Different QRI states correspond to either periodically transmitted reference signals (e.g., CSI-RS, SSB) or aperiodically transmitted CSI-RS. For PDSCH, signalling of QRI is over DCI. For PDCCH, signalling method is FFS, e.g, DCI or MAC-CE depending on signalling latency requirements. X is FFS, e.g., 3.

Proposal 2: To enable beam QRI-based beam indication, NR supports explicit signalling of reference signal index-to-QRI association to a UE for the case of a set of periodically transmitted reference signals, e.g., CSI-RS, SSB. FFS: signalling method, e.g., RRC, MAC-CE depending on signalling latency requirements.

Proposal 3: To enable QRI-based beam indication, NR supports signalling of a QRI state within the DCI that dynamically triggers a UE measurement on a set of aperiodic CSI-RS resources. The UE determines the CRI-to-QRI association based on the determination of a preferred CSI-RS resource.

5. References

[1] R1-1711015, "On DL beam indication," Ericsson, RAN #89 ah-NR2, June 2017.

While various embodiments are described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

Abbreviations

TRP—Transmission Point
PUCCH—Physical Uplink control channel
PDCCH—Physical Downlink control channel
PDSCH—Physical downlink shared channel
PUSCH—Physical uplink shared channel
PBCH—Physical broadcast channel
CSI-RS—Channel state information reference signal
SSB—Synchronization signal block
DCI—Downlink control information
MAC-CE—MAC Control Element
QRI—QCL Reference Indicator
RSI—Reference Signal Index
RI—Resource Indicator
CRI—CSI-RS resource indicator

The invention claimed is:

1. A method implemented in a wireless device, comprising:
receiving a first reference signal (RS);
before or after or while receiving the first RS, further receiving information indicating that the first RS is quasi-co-located (QCL) with a scheduled transmission, wherein the information comprises a quasi-co-location indicator (QRI) representing a QRI state selected from a set of available QRI states, wherein one or more of the available QRIs states is i) associated with an RS type and ii) associated with an RS index (RSI) identifying a transmission of an RS of the RS type with which the QRI state is associated; and
receiving the scheduled transmission under an assumption that the scheduled transmission is QCL with the first RS, wherein
the set of available QRI states comprises a first QRI state and a second QRI state,
the first QRI state is associated with a first type of RS,
the second QRI state is associated with a second type of RS, and
the first and second types of RS are two different types of RS from among the following three types of RS:
synchronization signal block (SSB),
periodic channel state information RS (CSI-RS), and
aperiodic CSI-RS.

2. The method of claim 1, wherein the first type of RS is SSB or periodic CSI-RS and the second type of RS is aperiodic CSI-RS.

3. The method of claim 1, wherein the first type of RS is associated with more robust beams than the second type of RS.

4. The method of claim 1, wherein said information indicates that the first RS is spatially QCL with the scheduled transmission, and wherein the scheduled transmission is received under an assumption that the scheduled transmission is spatially QCL with the first RS.

5. A wireless device, the wireless device comprising:
a receiver; and
a processor configured to control the receiver, wherein the wireless device is configured to:
receive a first reference signal (RS);
before or after or while receiving the first RS, further receiving information indicating that the first RS is quasi-co-located (QCL) with a scheduled transmission, wherein the information comprises a quasi-co-location indicator (QRI) representing a QRI state selected from a set of available QRI states, wherein one or more of the QRIs states is i) associated with an RS type and ii) associated with an RS index (RSI) identifying a transmission of an RS of the RS type with which the QRI state is associated; and
receive the scheduled transmission under an assumption that the scheduled transmission is QCL with the first RS, wherein
the set of available QRI states comprises a first QRI state and a second QRI state,
the first QRI state is associated with a first type of RS,
the second QRI state is associated with a second type of RS, and
the first and second types of RS are two different types of RS from among the following three types of RS:
synchronization signal block (SSB),
periodic channel state information RS (CSI-RS), and
aperiodic CSI-RS.

6. The wireless device of claim 5, wherein the first type of RS is SSB or periodic CSI-RS and the second type of RS is aperiodic CSI-RS.

7. The wireless device of claim 5, wherein the first type of RS is associated with more robust beams than the second type of RS.

8. The wireless device of claim 5, wherein said information indicates that the first RS is spatially QCL with the scheduled transmission, and wherein the scheduled transmission is received under an assumption that the scheduled transmission is spatially QCL with the first RS.

* * * * *